US007512860B2

(12) United States Patent  
Miyazaki et al.

(10) Patent No.: US 7,512,860 B2  
(45) Date of Patent: Mar. 31, 2009

(54) COMMUNICATION SYSTEM AND RECEIVING METHOD

(75) Inventors: Shunji Miyazaki, Kawasaki (JP); Kazuhisa Obuchi, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 10/999,803

(22) Filed: Nov. 30, 2004

(65) Prior Publication Data

US 2006/0002484 A1    Jan. 5, 2006

(30) Foreign Application Priority Data

Jun. 30, 2004    (JP)    ............... 2004-192444

(51) Int. Cl.
*H04L 1/18* (2006.01)

(52) U.S. Cl. .................. 714/751; 714/755; 714/760

(58) Field of Classification Search ............. 714/751, 714/750, 48, 57, 715, 748, 758, 755, 753, 714/760

See application file for complete search history.

(56) References Cited

U.S. PATENT DOCUMENTS

| 6,741,581 | B1 | 5/2004 | Sun et al. | |
|---|---|---|---|---|
| 7,143,330 | B2 * | 11/2006 | Ahn et al. | ............. 714/748 |
| 2002/0046379 | A1 | 4/2002 | Miki et al. | |
| 2002/0157058 | A1 * | 10/2002 | Ariel et al. | ............. 714/774 |

FOREIGN PATENT DOCUMENTS

| EP | 0 948 154 | 10/1999 |
|---|---|---|
| JP | 08-265304 | 10/1996 |

OTHER PUBLICATIONS

Partial European Search Report, dated Aug. 13, 2007, from corresponding European patent application.
Argenti et al., "An ARQ Protocol for Mobile Radio Systems", Proceedings of the International Conference on Communications, New York, IEEE, US, vol. 4, Jun. 14, 1992, pp. 1323-1326, XP010062086.
European Search Report dated Oct. 12, 2007, from the corresponding European Application.

* cited by examiner

*Primary Examiner*—Shelly A Chase
*Assistant Examiner*—Fritz Alphonse
(74) *Attorney, Agent, or Firm*—Katten Muchin Rosenman LLP

(57) ABSTRACT

A receiving apparatus in a communication system in which when a systematically encoded signal cannot be decoded correctly on a receiving side, the signal is retransmitted from a transmitting side. The receiving apparatus combines stored data, which has been generated based upon data already received, and newly received data, decides a range of quantization levels of the combined data using an average level only of systematic bits of the stored data and newly received data, quantizes the combined data based upon the range of quantization levels and number of quantization bits, applies decoding processing to the quantized data, notifies the transmitting side of whether decoding could be performed correctly, and stores the combined data as the stored data when decoding cannot be performed correctly.

19 Claims, 30 Drawing Sheets

FIG. 28 PRIOR ART
(A) FIRST TIME: SYSTEMATIC BITS ONLY
(B) FIRST RETRANSMISSION: PARITY BITS ONLY
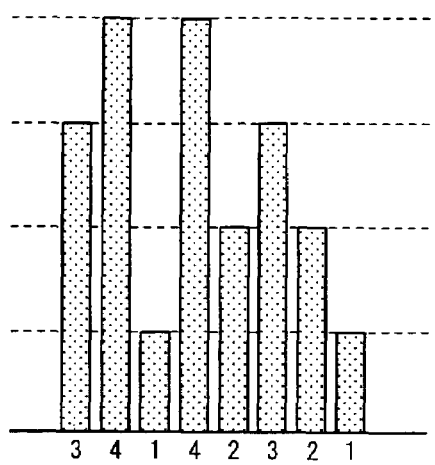
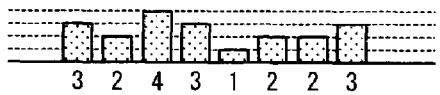
H-ARQ COMBINING AND QUANTIZATION AFTER COMBINING
(C)
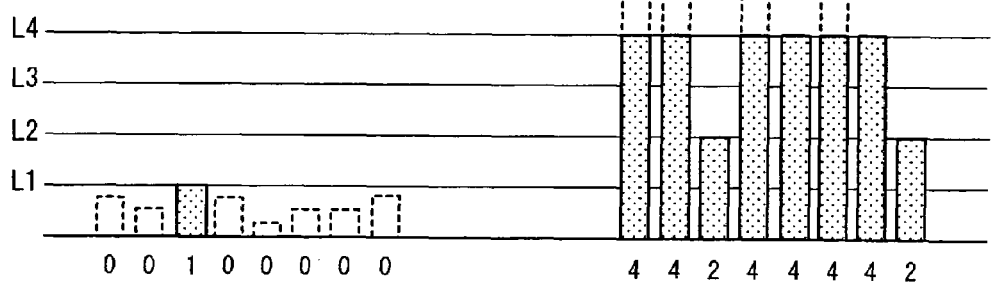
FIG. 29 PRIOR ART
ENCODED INFORMATIONAL DATA BLOCK (A)
| ... | BLOCK #1 | BLOCK #2 | BLOCK #3 | ... |
|---|---|---|---|---|
(B)
NOTIFICATION INFORMATION
| ... | ACK/NACK | CQI | ACK/NACK | CQI | ACK/NACK | CQI | ... |
|---|---|---|---|---|---|---|---|

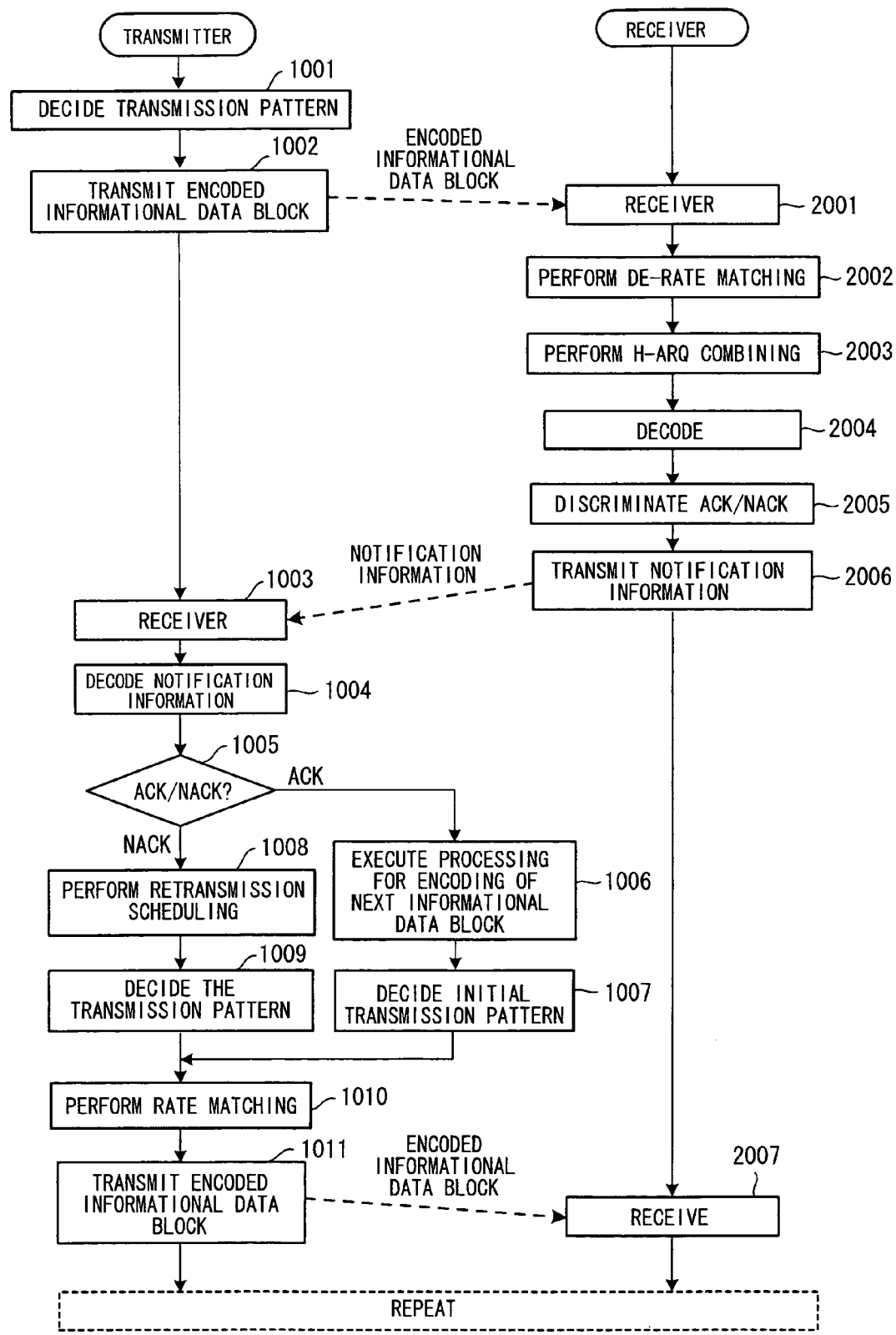

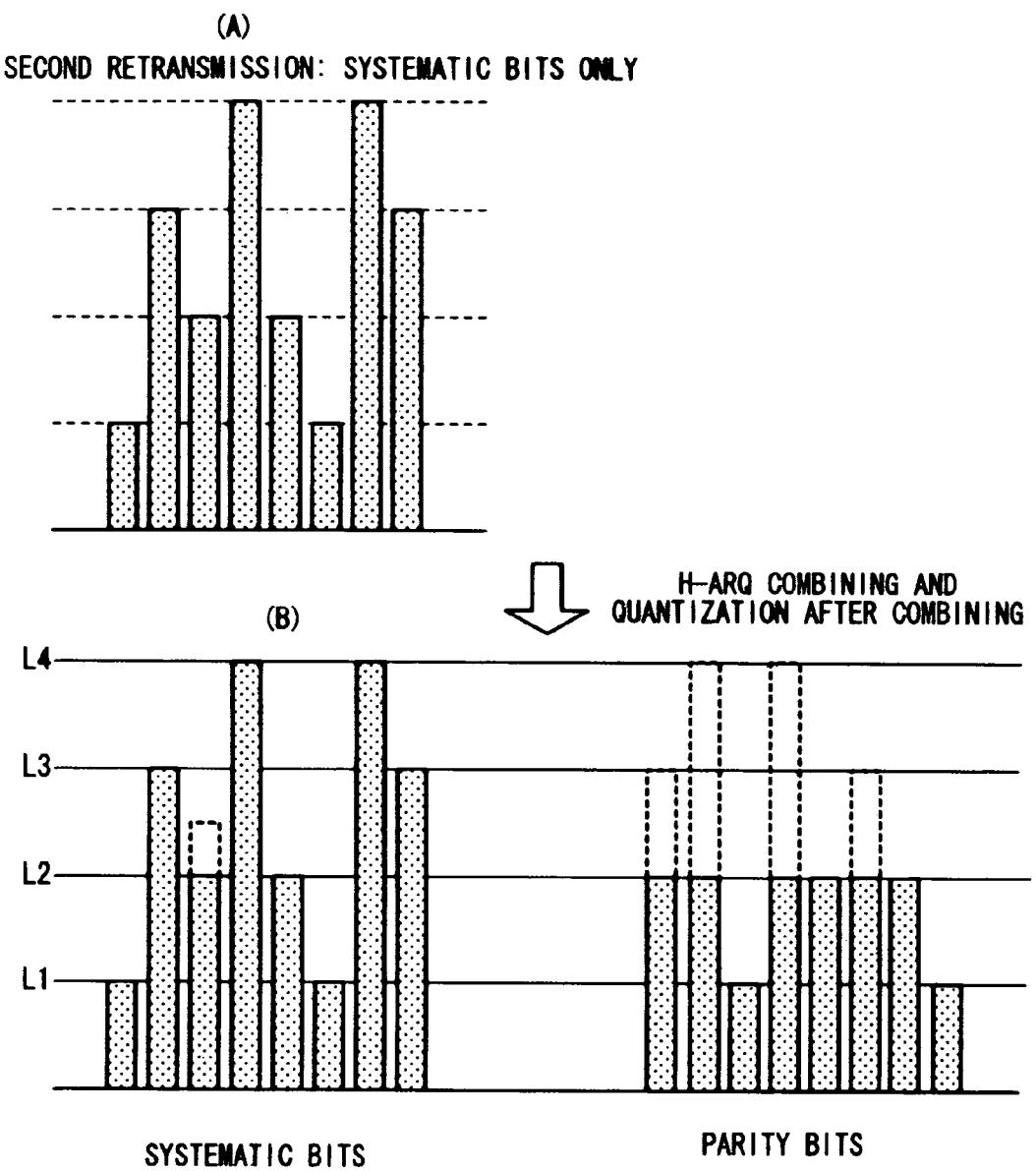

COMMUNICATION SYSTEM AND RECEIVING METHOD

BACKGROUND OF THE INVENTION

This invention relates to a communication system and to a receiving method. More particularly, the invention relates to a communication system and to a receiving method in which when an encoded signal could not be decoded correctly on a receiving side, the signal is retransmitted from the transmitting side. More specifically, the invention relates to a receiving method in a communication system that sends and receives informational data, the method having an ARQ (Automatic Repeat Request) function and an FEC (Forward Error Correction) function in order to improve data transmission quality (this method is referred to as a "hybrid ARQ", or "H-ARQ", method), and to a receiving apparatus and transmitting apparatus that implement the H-ARQ method.

(1) H-ARQ

In H-ARQ, a transmitter transmits as a packet all or part of an informational data block that has undergone error-correcting encoding. A receiver receives the packet and, if the received data cannot be decoded correctly, requests the transmitter to retransmit the data. In response to the retransmit request, the transmitter retransmits as a packet all or part of the same encoded data block in accordance with a stipulated method. In the sending and receiving of a systematic code in which the informational data per se (referred to as "systematic bits") is contained in the code itself, the receiver can perform decoding using only the systematic bits even if there are no parity bits. Partial transmission, therefore, is an effective method.

FIG. 26 illustrates an example of a process for retransmitting a systematic code having an encoding rate of 1/3 (the systematic code is composed of systematic bits and parity bits having twice the size of the systematic bits). In this example, the data size of a packet capable of being transmitted at one time is the same as the informational data block itself, whereas non-redundant parity bits are transmitted twice to completely transmit all data. FIG. 27 is a block diagram of a transmitter 1 and receiver 2 in a communication system of such a systematic code. The transmitter 1 includes an error-detecting encoder 1a for appending an error-detecting code to informational bits to be transmitted; an error-correcting encoder 1b for applying error-correcting encoding processing to the informational bits to which the error-detecting code has been appended and for outputting the result; a transmission-pattern designating unit 1c for segmenting an informational data block in accordance with a stipulated method to thereby packetize the data, and for transmitting the packets successively; a rate matching unit 1d for executing rate-matching processing (e.g., punctured encoding); a modulator 1e of a modem for mapping signal points (e.g., for performing QPSK or 16QAM modulation; and a transmitting unit (not shown) for frequency-converting the modulated signal to a radio-frequency signal, applying high-frequency amplification and transmitting the amplified signal. As will be described later, the receiver 2 determines whether the information in a received packet has been decoded correctly or not and notifies the transmitter 1 of success/failure (ACK/NACK) of reception. A receiving unit (not shown) in the transmitter 1 frequency-converts a radio signal received from the receiver 2 to a baseband signal, a demodulator 1f of the modem demodulates the receive signal and an ACK/NACK discriminator 1g discriminates ACK/NACK. An H-ARQ controller 1h instructs the transmission-pattern designating unit 1c to perform retransmission if NACK is discriminated and to transmit a new information block if ACK is discriminated. If NACK is discriminated, the transmission-pattern designating unit 1c performs control in accordance with a stipulated method to retransmit transmit information that been stored in a buffer (not shown). If ACK is discriminated, then the transmission-pattern designating unit 1c deletes the transmit information that has been stored in the buffer and, packetizes a new information block and transmits the same.

The receiver 2 has a receiving unit (not shown) for frequency-converting the radio signal from the transmitter 1 to a baseband signal; a demodulator 2a of a modem for applying QPSK demodulation and outputting the demodulated data as likelihood (soft-decision) data; an average-value calculation unit 2b for calculating the average value of the amplitudes of the soft-decision demodulated data and deciding the quantization range and quantization levels; a quantizer 2c for quantizing the receive signal based upon the quantization levels and inputting the quantized signal to a de-rate matching unit 2d, the latter executing processing (e.g., punctured decoding) that is the reverse of rate matching; an H-ARQ buffer 2f for storing packet data that failed to be decoded the last time data was received; and an H-ARQ combiner 2e for combining data that has been stored in the H-ARQ buffer 2f and retransmission data just received. H-ARQ combining is performed by appropriately diversity-combining (as by maximal-ratio combining) the values of corresponding bits of the stored data and newly received data. In the event that only one value exists for corresponding bits, the value of this bit is used as is as the combined output. The receiver 2 further includes a post-combination average-value calculation unit 2g for calculating the average value of the combined signal and deciding the quantization range and quantization levels based upon the average value; a post-combination quantizer 2h for quantizing the combined signal based upon the quantization levels and inputting the quantized signal to an error-correcting decoder 2i, the latter executing error-correcting decoding processing and outputting decoded bits if decoding can be performed correctly; and an error detector 2j for detecting whether or not an error is present based upon the error-detecting code and outputting the result of detection.

The receiver 2 further includes a NACK/ACK discriminator 2k for instructing a notification-information encoder 2m whether to transmit NACK or ACK (abnormal reception or normal reception) to the transmitter 1 based upon the result of error detection; the notification-information encoder 2m for encoding notification information as instructed; and a modulator 2n for modulating the NACK/ACK notification information and transmitting the modulated signal to the transmitter 1 via a transmitting unit (not shown).

If decoding can be performed correctly, the data that has been stored in the H-ARQ buffer 2f is cleared from the buffer. If decoding cannot be performed correctly, then the stored data in the H-ARQ buffer 2f is updated by the H-ARQ combined signal. Further, in order for the H-ARQ combiner 2e to perform combining correctly, it is necessary to know the data structure of the packet transmitted. For example, in a case where a plurality of data formats are used to transmit data and the transmitter 1 transmits data adaptively in a prescribed format depending upon the propagation environment, it must be ascertained in which format the transmission was made. In such case the transmitter 1 gives such notification to the receiver 2 in parallel with the format information using a signal separate from the packet by means not shown.

(2) Quantization

In a case where decoding processing is implemented by a digital circuit, the receive data is quantized at a stipulated amplitude range and stipulated number of bits by the time it enters the decoder. The parameter that stipulates quantization is decided so as to obtain a performance equivalent to that which prevails when data that is not quantized is decoded by an ideal decoder. From the standpoint of circuit mounting, however, the number of bits is selected to be as small as possible in order to reduce the scale of the circuitry. With H-ARQ, it is expected that the performance obtained at retransmission will be equivalent to that obtained when combined data is decoded by an ideal decoder.

Conventionally, newly received data and stored data that are to undergo combining are quantized independently by stipulated parameters. These items of data are expressed by amplitude levels (e.g., the levels of the output data of demodulator 2a) that serve as a common platform in order to handle the data as one set of data, combining processing is executed, quantization processing is carried out again by a stipulated method and the resultant data is adopted as the input data to the decoder 2i. FIG. 28 illustrates an example of a case where uniform quantization is performed using two bits and four levels with the levels being spaced apart equally. For the sake of simplicity, all of the data is limited to positive data. In accordance with the retransmission patterns of FIG. 26, initially data having small reception amplitudes and composed solely of systematic bits is received, as indicated at (A) in FIG. 28. At the first retransmission, data composed only of parity bits of large amplitudes is received, as indicated at (B) in FIG. 28. Since the systematic bits and parity bits are quantized independently, the respective levels are expressed by quantization ranges and quantization codes at a stage prior to combination, the quantization code of the systematic bits is expressed as (3, 2, 4, 3, 1, 2, 2, 3) and the quantization code of the parity bits is expressed as (3, 4, 1, 4, 2, 3, 2, 1). In order to obtain common quantization levels at the time of combining, the level average (the average of 16 bits) of all data bits of the systematic bits and parity bits is calculated, a new quantization range (e.g., twice the average value) is decided from the calculated average, as shown at (C), and four new quantization levels L1 to L4 are set. In the case of FIG. 28, there is no combining processing because there is no overlapping of data. The data bits, therefore, are converted to code at the new quantization levels. If the maximum value at the new level is exceeded, then the maximum value is applied. As a result, the systematic bits become (0, 0, 1, 0, 0, 0, 0, 0), the parity bits become (4, 4, 2, 4, 4, 4, 4, 2), and this becomes the data input to the decoder 2i.

(3) Deciding Combination of Feedback, which is Result of Decoding, and Transmit Data Illustrated in FIG. 29 by way of example are the format of encoded information on a data channel in a case where H-ARQ stipulated by 3GPP Release 5 is employed and the format of information (referred to as "notification information" below) reported from the receiver 2 to the transmitter 1 in order to request retransmission. The notification information is composed of an ACK/NACK signal indicating success/failure of decoding, and CQI bits which are signals corresponding to the SN ratio of the receive data.

FIG. 30 illustrates the flow of a sequence up to transmission of the next transmit bit following transmission of notification information from the receiver 2 to the transmitter 1. Processing relating to the CQI signal corresponding to the SN ratio is omitted.

A base station constituting the transmitter 1 decides the transmission pattern, segments the encoded information blocks of FIG. 29 to packetize the same and transmits the packets (blocks) (steps 1001, 1002).

If a mobile station constituting the receiver 1 receives a packet (an encoded informational data block), then the mobile station executes de-rate matching processing, H-ARQ combining processing, decoding processing and ACK/NACK discrimination processing (steps 2001 to 2005), creates notification information and transmits the notification information to the transmitter 1 (step 2006).

The transmitter 1 receives the signal sent from the receiver, decodes the notification information from the receive signal and discriminates ACK/NACK from the notification information (steps 1003 to 1005). If the notification is ACK, the transmitter 1 encodes the next informational data block (step 1006), refers to the CQI bits and decides the bit size and modulation scheme of the new data block (i.e., decides the initial transmission pattern at step 1007). If the notification is found to be NACK at step 1005, on the other hand, then the transmitter 1 performs retransmission scheduling (step 1008) and selects the combination of bits to be transmitted (decides the retransmission pattern at step 1009). It should be noted that the retransmission pattern is decided in accordance with a stipulated method that depends upon the number of retransmissions.

Step 1007 or 1009 is followed by execution of rate matching processing and transmission of the encoded informational data block (steps 1010, 1011). The receiver 2 receives the data block, repeats the foregoing processing (step 2007) and executes sending and receiving of packets.

(4) Adaptive Encoding Error Control Scheme

An adaptive encoding error control scheme for changing the error-correcting encoding scheme or the encoding rate in accordance with the state of the transmission path has been proposed heretofore (see JP8-265304A). This example of the prior art uses an error controller on the receiving side to execute decoding according to all encoding schemes or encoding rates that might possibly be used on the transmitting side, apply error detection to each of the results of decoding and adopt a decoded result for which error could not be detected as the correct result of reception. Furthermore, the encoding scheme or encoding rate is selected on the receiving and is indicated to the transmitting side as feedback.

(1) First Problem

In the quantization method according to the prior art, a quantization method based upon the smallest number of quantization bits best suited in a case where application is to the receive data alone is also applied as is to quantization of the data that is the result of combining. However, such a quantization method is not necessarily the optimum quantization method. This will be described with reference again to the example of FIG. 28. In the series of transmission processes regarding the systematic code in the example of FIG. 28, the description will be in accordance with the retransmission patterns of FIG. 26.

In H-ARQ control, the average reception power of packets in a transmission process performed with regard to one set of data blocks is not necessarily constant. There are cases where transmission power is changed adaptively by the scheduling of the transmitter and cases where even though transmission power is constant, the reception power fluctuates owing to the occurrence of fading in the receive signal when the receiver (mobile station) moves. Accordingly, if systematic bits capable of being decoded themselves independently are selected preferentially as the data packet to be transmitted the first time (see FIG. 26), then the power of this packet will diminish, as indicated at (A) in FIG. 28, and the SN ratio will worsen. Consequently, decoding fails and the packet of the first retransmission is sent upon elapse of a fixed period of time. This packet is decided in accordance with a stipulated pattern in such a manner that parity bits are selected preferentially. However, the packet only has a small size that cannot contain all of the code bits and therefore only some of the parity bits can be transmitted. The reception power of this packet is very large, as indicated at (B) in FIG. 28, combination is performed at a large SN ratio and it can be expected that the result of combining the signal with the data of the systematic bits of the first transmission and performing decoding will be ACK with a high probability. It is assumed that ACK is actually obtained with an ideal decoder.

However, when the conventional quantization method is applied, as shown in FIG. 28, the distribution range of data amplitudes is too large with the systematic bits of (A) and the parity bits of (B), and the values of the data represented by systematic bits of small amplitude are rounded off almost to zero, as indicated at (C). Effective information is lost as a result.

(2) Second Problem

As indicated at (A) in FIG. 31, a problem arises also in a case where large-amplitude systematic-bit priority data is received in a second retransmission that follows FIG. 28. That is, when large systematic bits indicated at (A) of FIG. 31 are received as data of a second retransmission, new quantization levels L1 to L4 obtained when this retransmission data is combined take on levels near the original quantization levels of the parity bits of the first retransmission, as indicated at (B) in FIG. 31. However, at the time of combination in the first retransmission, parity-bit data of large amplitude that exceeds the maximum value is replaced by the maximum value prevailing at this time, as indicated by the dashed lines at (C) of FIG. 28. Consequently, the parity bits after the combination of the first retransmission become small in amplitude in comparison with the original data and information is lost. In other words, the reliability of the parity bits is lost and the probability that decoding will fail rises.

(3) Third Problem

With the conventional method of feeding result of decoding (ACK/NACK and encoding scheme or encoding rate) from the receiver to the transmitter, the result of combining in the receiver is not reported and therefore a set of retransmission data decided by stipulated scheduling not related to the result of combining is sent. This retransmission data is not necessarily the optimum data. For example, if a set of retransmission data is decided so as to retransmit a different combination of the parity bits from the second retransmission onward when error is detected because the values of data of the systematic bits have been rounded off almost to zero, then the process will continue advancing without the presence of the information of the systematic bits and, hence, the error will continue.

SUMMARY OF THE INVENTION

Accordingly, an object of the present invention is to so arrange it that a quantization method is optimized with regard to important systematic bits when decoding is performed, whereby the information of the systematic bits is maintained to the maximum extent.

Another object of the present invention is to maintain the amplitude information of parity bits having large amplitude and to reduce quantization error.

A further object of the present invention is to so arrange it that the information possessed by optimum retransmission data that can be judged on the receiver side is transmitted to the transmitter, thereby making optimum decoding processing possible.

According to the present invention, the foregoing objects are attained by first to fifth receiving apparatus, which are set forth below, in a communication system in which when an encoded signal cannot be decoded correctly on a receiving side, the signal is retransmitted from a transmitting side.

The first receiving apparatus of the present invention comprises: means for receiving a retransmission signal; combining means for combining stored data, which has been generated based upon data already received, and newly received data; means for deciding a range of quantization levels of the combined data based upon a characteristic of the stored data and newly received data; quantizing means for quantizing the combined data based upon the a range of quantization levels and number of quantization bits; decoding means for applying decoding processing to the quantized data; means for notifying the transmitting side of whether decoding could be performed correctly; and means for storing the combined data as the stored data when decoding cannot be performed correctly.

The second receiving apparatus of the present invention comprises: means for receiving a retransmission signal; combining means for combining stored data, which has been generated based upon data already received, and newly received data; means for deciding a range of quantization levels of the combined data using an average level only of systematic bits of the stored data and newly received data; quantizing means for quantizing the combined data based upon the a range of quantization levels and number of quantization bits; decoding means for applying decoding processing to the quantized data; means for notifying the transmitting side of whether decoding could be performed correctly; and means for storing the combined data as the stored data when decoding cannot be performed correctly.

The third receiving apparatus of the present invention comprises: means for receiving and outputting a retransmission signal; combining means for combining stored data, which has been generated based upon data already received, and newly received data; means for deciding a range of quantization levels of the combined data using an average level of all data of systematic bits and parity bits of the stored data and newly received data; quantizing means for quantizing the combined data based upon the range of quantization levels and number of quantization bits; decoding means for applying decoding processing to the quantized data; means for notifying the transmitting side of whether decoding could be performed correctly; and means for storing the combined data as the stored data when decoding cannot be performed correctly.

The fourth receiving apparatus of the present invention comprises the following means with regard to receive data composed of systematic bits: (1) combining means for combining stored data, which has been generated based upon data already received, and newly received data; (2) means for deciding a range of quantization levels of the combined data using an average level only of systematic bits of the stored data and newly received data; (3) quantizing means for quantizing the combined data based upon the range of quantization levels and number of quantization bits; and (4) means for storing the combined data as the stored data if decoding could not be performed correctly; and the following means with regard to receive data composed of parity bits: (1) combining means for combining stored data, which has been generated based upon data already received, and newly received data; (2) means for deciding a range of quantization levels of the combined data using an average level only of parity bits of the stored data and newly received data; (3) quantizing means for quantizing the combined data based upon the range of quantization levels and number of quantization bits; and (4) means for storing the combined data as the stored data if decoding could not be performed correctly; the receiving apparatus further comprising decoding means for executing decoding processing using each item of quantized data; and means for notifying the transmitting side of whether decoding could be performed correctly.

The fifth receiving apparatus of the present invention comprises: means for receiving a retransmission signal; combining means for combining stored data, which has been generated based upon data already received, and newly received data; means for deciding a range of quantization levels of the combined data based upon a characteristic of the stored data and newly received data; quantizing means for quantizing the combined data based upon the range of quantization levels and number of quantization bits; decoding means for applying decoding processing to the quantized data; means for deciding a combination of next retransmission data if decoding could not be performed correctly; means for notifying the transmitting side of information as to whether decoding could be performed correctly and of combination information of the retransmission data; and means for storing the combined data as the stored data if decoding could not be performed correctly. In a case where a systematic code is received from the transmitting side, the means for deciding the combination of the retransmission data measures the reliability of the systematic bits. If the reliability is less than a set value, then the means for deciding the combination of the retransmission data decides the combination of the retransmission data so as to transmit the systematic bits preferentially as the next retransmission data. Further, the means for deciding the combination of the retransmission data measures the reliability of the data of the systematic bits and of the parity bits, applies a stipulated weighting coefficient to these reliabilities and decides the combination of retransmission data so as to transmit the data having the lower reliability preferentially as the next retransmission data.

In accordance with the present invention, the foregoing objects are attained by providing a transmitting apparatus in a communication system in which when an encoded signal cannot be decoded correctly on a receiving side, combinations of data constituting the signal are retransmitted from the receiving side in order, comprising means for applying error detecting and correcting encoding processing to transmit data; means for transmitting an encoded signal that has been subjected to error detecting and correcting encoding processing; means for receiving notification information of normal reception/abnormal reception and combination information of retransmission data sent from a receiving apparatus; and means for retransmitting data based upon the received combination information of the retransmission data in case of abnormal reception.

In accordance with the present invention, the foregoing objects are attained by providing first and second receiving methods, which are set forth below, in a communication system in which when an encoded signal cannot be decoded correctly on a receiving side, the signal is retransmitted from a transmitting side.

The first receiving method of the present invention comprises the steps of: combining stored data, which has been generated based upon data already received, and newly received data; deciding a range of quantization levels of the combined data based upon a characteristic of the stored data and newly received data; quantizing the combined data based upon the range of quantization levels and number of quantization bits; applying decoding processing to the quantized data and notifying the transmitting side of whether decoding could be performed correctly; and storing the combined data as the stored data if decoding could not be performed correctly and clearing the stored data if decoding could be performed correctly.

The second receiving method of the present invention comprises the following steps with regard to receive data composed of systematic bits: (1) combining stored data, which has been generated based upon data already received, and newly received data; (2) deciding a range of quantization levels of the combined data using an average level only of systematic bits of the stored data and newly received data; and (3) quantizing the combined data based upon the range of quantization levels and number of quantization bits; and the following steps with regard to receive data composed of parity bits: (1) combining stored data, which has been generated based upon data already received, and newly received data; (2) deciding a range of quantization levels of the combined data using an average level only of parity bits of the stored data and newly received data; and (3) quantizing the combined data based upon the range of quantization levels and number of quantization bits, executing decoding processing using each item of the data obtained by each quantization, notifying the transmitting side of whether decoding could be performed correctly, storing each item of combined data as the stored data if decoding could not be performed correctly, and clearing each item of the stored data if decoding could be performed correctly.

In accordance with the present invention, the quantization method is optimized with regard to important systematic bits when decoding is performed, whereby the information of the systematic bits is maintained to the maximum extent. As a result, a characteristic sufficiently close to that of an ideal decoder is obtained.

In accordance with the present invention, the amplitude information of parity bits having large amplitude is maintained, quantization error can be reduced and it is possible to approach the characteristic of an ideal decoder.

In accordance with the present invention, information of optimum retransmission data that can be judged on the receiver side can be transmitted to a transmitter. In addition, by retransmitting this retransmission data, optimum decoding processing becomes possible and characteristics can be improved.

Other features and advantages of the present invention will be apparent from the following description taken in conjunction with the accompanying drawings.

BRIEF DESCRIPTION OF THE DRAWINGS

FIG. 28 illustrates an example of a case where uniform quantization is performed at two bits and four levels with the levels being spaced apart equally according to the prior art;

FIG. 29 illustrates the format of encoded information on a data channel and the format notification information reported from a receiver to a transmitter in order to request retransmission in an example of the prior art;

FIG. 30 illustrates the flow of a sequence up to transmission of a next transmit bit according to the prior art; and FIG. 31 is a diagram useful in describing problems that arise with retransmission control according to the prior art.

DESCRIPTION OF THE PREFERRED EMBODIMENTS

(A) Principles of the Present Invention

Data of a broad amplitude range can be expressed at one time simply by increasing the number of bits. However, if the circuitry becomes large in scale and the amplitude range of receive data is not enlarged, superfluous data will be included needlessly. This method, therefore, is not necessarily the optimum method. Accordingly, a first aspect of the present invention so arranges it that the number of bits can be fixed to the minimum number of quantization bits and optimum quantization carried out. More specifically, if data composed of systematic bits is included after combining, optimum quantization is performed by being limited solely to the data composed of the systematic bits and the levels of this quantization (the quantization levels) are applied to the quantization of the remaining parity bits.

A second aspect of the present invention executes quantization processing by splitting it between the data of systematic bits and the data of parity bits. In this case, the meaning of each of the quantization codes generally differs and therefore processing is executed upon making a conversion to a common quantization expression at the time of decoding.

A third aspect of the present invention appends a signal, which indicates the attribute (whether data is that of a systematic bit or priority parity bit) of retransmission data desired next, to a status notification signal. As a result, the transmitting side can be notified of the optimum combination of transmit data. The optimum combination of transmit data is selected so as to optimize the decoding characteristic when the next newly received data is further combined with the data of the present result of combination.

(B) First Embodiment

Figure 1:
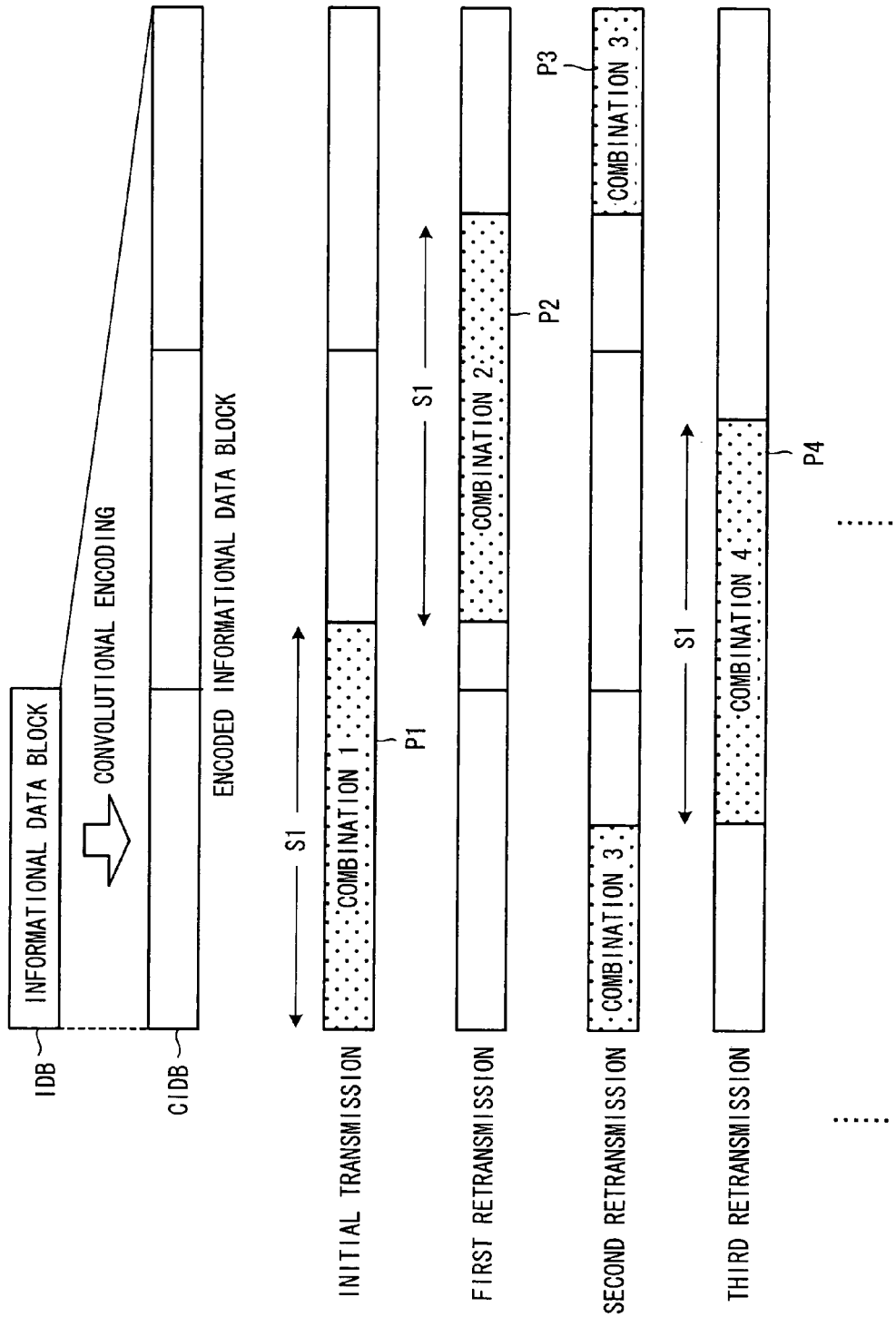
FIG. 1 is a diagram useful in describing retransmission patterns according to a first embodiment of the present invention.

FIG. 1 is a diagram useful in describing a retransmission pattern according to a first embodiment of the present invention. It is assumed that a nonsystematic code having an encoding rate of 1/3 is used as an error-correcting code in an H-ARQ communication system. In a case where a transmitter transmits a new informational data block, the transmitter appends CRC parity and then performs encoding. The size of an encoded informational data block CIDB is approximately three times the size of an informational data block IDB before encoding owing to the encoding rate of 1/3. However, there are cases where size S1 of a packet transmitted at one time is smaller than the size of the encoded informational data block CIDB, and in such cases puncturing processing is applied to the encoded informational data block. The transmitter transmits a packet P1 of a combination 1 at the time of a first transmission, a packet P2 of a combination 2 at the time of a first retransmission owing to reception failure, a packet P3 of a combination 3 at the time of a second retransmission, a packet P4 of a combination 4 at the time of a third retransmission, and so on in similar fashion.

Figure 2:
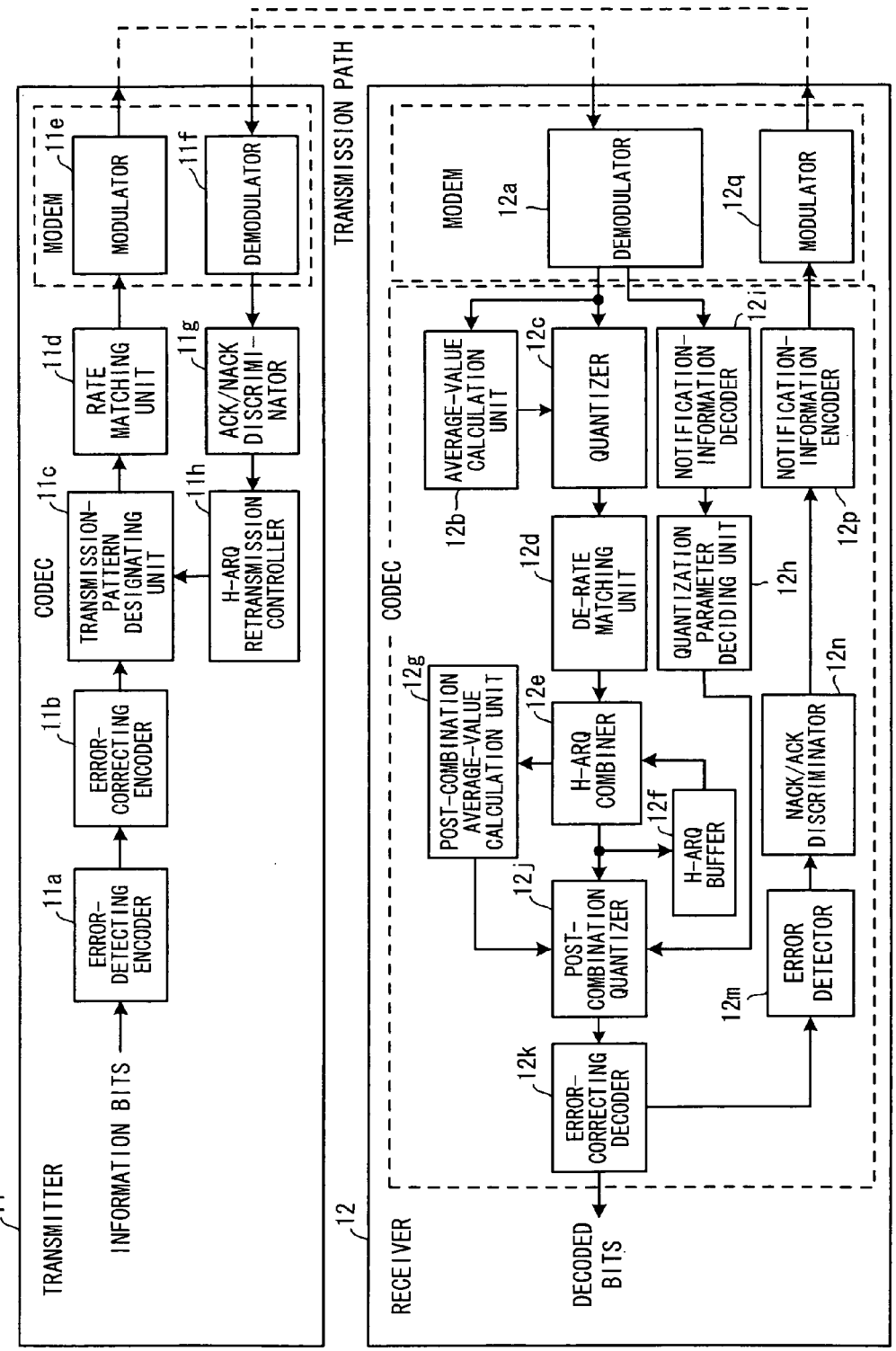
FIG. 2 is a block diagram of a transceiver according to the first embodiment.

FIG. 2 is a block diagram of a transceiver 11 according to the first embodiment. The transmitter 11 includes an error-detecting encoder 11a for appending a CRC error-detecting code to informational bits to be transmitted; an error-correcting encoder 11b for applying error-correcting encoding processing having a prescribed encoding rate, e.g., nonsystematic encoding processing (convolutional encoding), to the informational bits to which the error-detecting code has been appended and for outputting the result; and a transmission-pattern designating unit 11c for segmenting the encoded informational data block CIDB in accordance with a stipulated method to thereby packetize the data, and for transmitting the packets. Further, the transmission-pattern designating unit 11c transmits format information, which includes the encoding rate, to the receiver via a control channel.

The transmitter further includes a rate matching unit 11d for executing rate-matching processing (e.g., punctured encoding); a modulator 11e of a modem for mapping signal points (e.g., for performing QPSK or 16QAM modulation; and a transmitting unit (not shown) for frequency-converting the modulated signal to a radio-frequency signal, applying high-frequency amplification and transmitting the amplified signal. As will be described later, a receiver 12 determines whether the information in a received packet has been decoded accurately or not and notifies the transmitter 11 of success/failure (ACK/NACK) of reception. A receiving unit (not shown) in the transmitter 11 frequency-converts a radio signal received from the receiver 12 to a baseband signal, a demodulator 11f of the modem demodulates the receive signal and an ACK/NACK discriminator 11g discriminates ACK/NACK. An H-ARQ controller 11h instructs the transmission-pattern designating unit 11c to perform retransmission if NACK is discriminated and to transmit a new information block if ACK is discriminated. If NACK is discriminated, the transmission-pattern designating unit 11c performs control in accordance with a stipulated method to retransmit transmit information that been stored in a buffer (not shown). If ACK is discriminated, then the transmission-pattern designating unit 11c deletes the transmit information that has been stored in the buffer, packetizes a new information block and transmits the same.

The receiver 12 has a receiving unit (not shown) for frequency-converting the radio signal from the transmitter 11 to a baseband signal; a demodulator 12a of a modem for applying QPSK demodulation, for example, and outputting the demodulated data as likelihood (soft-decision) data; an average-value calculation unit 12b for calculating the average value of the amplitudes of the soft-decision demodulated data and deciding the quantization range and quantization levels; a quantizer 12c for quantizing the receive signal based upon the quantization levels and inputting the quantized signal to a de-rate matching unit 12d, the latter executing processing (e.g., punctured decoding) that is the reverse of rate matching on the transmitting side; an H-ARQ buffer 12f for storing packet data that failed to be decoded the last time data was received; and an H-ARQ combiner 12e for combining data that has been stored in the H-ARQ buffer 12f and retransmission data just received. Combining is performed by appropriately diversity-combining (as by maximal-ratio combining) the values of corresponding bits of the stored data and newly received data. In the event that only one value exists for corresponding bits, the value of this bit is used as is as the combined output. The receiver 12 further includes a post-combination average-value calculation unit 12g for calculating the average value of the combined signal, which is output from the H-ARQ combiner 12e, and inputting the average value to a post-combination quantizer 12j.

The quantization range of the post-combination quantizer 12j is decided by multiplying the average value of the amplitude of the combined signal by a predetermined magnification m. The predetermined magnification m, which is a quantization parameter that assures an optimum characteristic, depends upon the encoding rate. A notification-information decoder 12i acquires format information that is sent from the transmitter 11 on the control channel, obtains the encoding rate and inputs it to a quantization parameter deciding unit 12h. The latter obtains the relationship between the encoding rate and predetermined magnification m in advance and holds the relationship in the form of a table, and therefore refers to the table, selects the optimum quantization parameter (predetermined magnification m) that conforms to the encoding rate input thereto and inputs the parameter to the post-combination quantizer 12j. The post-combination quantizer 12j decides the quantization range and quantization levels by multiplying the average value of the amplitude of the combined signal by the predetermined magnification m, quantizes the combined signal that enters from the H-ARQ combiner 12e and inputs the quantized signal to an error-correcting decoder 12k. The latter executes error-correcting decoding processing and outputs decoded bits if decoding can be performed correctly. An error detector 12m detects whether or not an error is present based upon the error-detecting code and outputs the result of detection.

The receiver 2 further includes a NACK/ACK discriminator 12n for instructing a notification-information encoder 12p whether to transmit NACK or ACK to the transmitter 11 based upon the result of error detection; the notification-information encoder 12p for encoding notification information as instructed; and a modulator 12q for modulating the NACK/ACK notification information and transmitting the modulated signal to the transmitter 11 via a transmitting unit (not shown).

If decoding can be performed correctly, the data that has been stored in the H-ARQ buffer 12f is cleared from the buffer. If decoding cannot be performed correctly, then the stored data in the H-ARQ buffer 12f is updated by the H-ARQ combined signal.

The foregoing is for a case where the transmitter transmits data that has been encoded by nonsystematic encoding. However, the invention is also applicable to systematic code.

In accordance with the first embodiment, quantization can be performed by deciding an optimum quantization reference, e.g., quantization range and quantization levels, based upon the encoding rate.

(C) Second Embodiment

Figure 3:
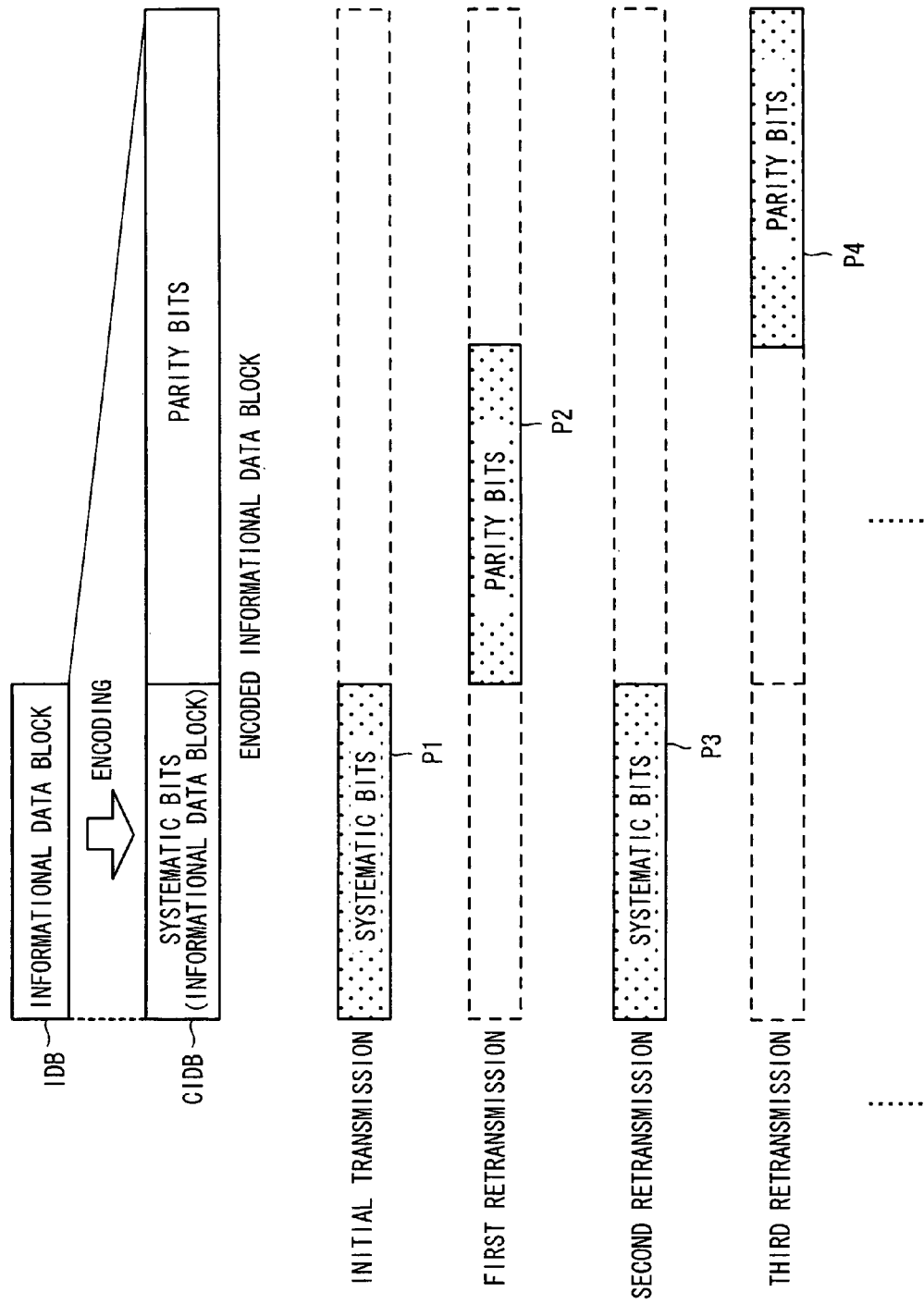
FIG. 3 is a diagram useful in describing retransmission patterns.

In a second embodiment, use is made of a systematic code having an encoding rate of 1/3, as illustrated in FIG. 3, as the encoding method. Further, the size of packets P1 to P4 is exactly ⅓ of the encoded informational data block CIDB, and it is assumed that retransmission is in accordance with the illustrated patterns.

Figure 4:
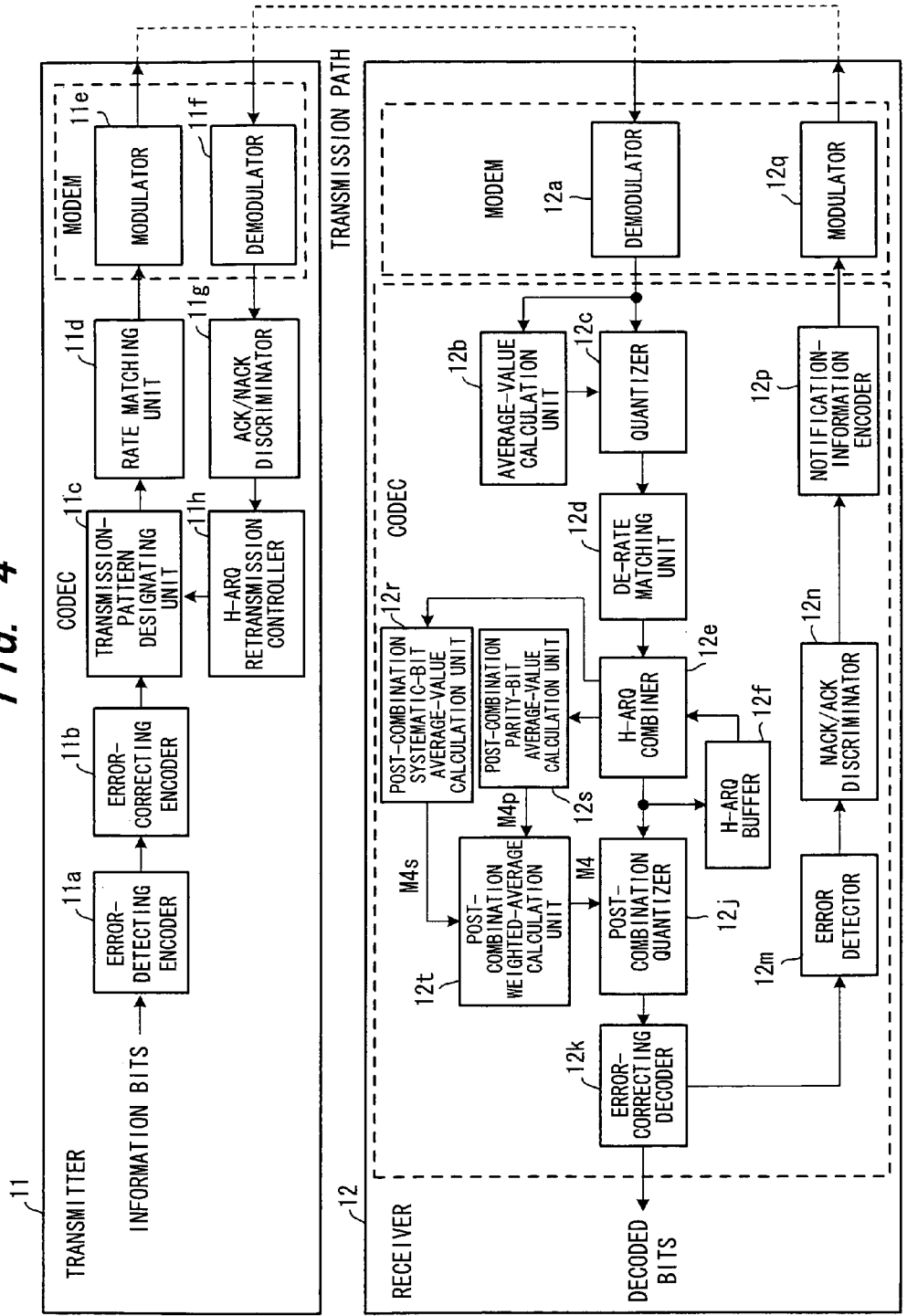
FIG. 4 is a block diagram of a transceiver according to a second embodiment of the present invention.

FIG. 4 is a block diagram of a transceiver according to the second embodiment, in which components identical with those of the first embodiment are designated by like reference characters. The operation of the transmitter 11 is the same as that of the first embodiment. The method of deciding the quantization range and quantization levels in the receiver 12 differs from that of the first embodiment. More specifically, in the first embodiment the quantization range and quantization levels in the post-combination quantizer 12j are decided using the encoding rate sent from the OB area 11. In the second embodiment, these are decided by a different method, which is indicated below.

The receiver 12 has the receiving unit (not shown) for frequency-converting the radio signal from the transmitter 11 to a baseband signal; the demodulator 12a of the modem for applying QPSK demodulation, for example, and outputting the demodulated data as likelihood (soft-decision) data; the average-value calculation unit 12b for calculating the average value of the amplitudes of the soft-decision demodulated data and deciding the quantization range and quantization levels; the quantizer 12c for quantizing the receive signal based upon the quantization level and inputting the quantized signal to the de-rate matching unit 12d, the latter executing processing that is the reverse of rate matching on the transmitting side; the H-ARQ buffer 12f for storing packet data that failed to be decoded the last time data was received; and the H-ARQ combiner 12e for combining, by the same method as that of the first embodiment, data that has been stored in the H-ARQ buffer 12f and retransmission data just received.

The receiver 12 further includes a post-combination systematic-bit average-value calculation unit 12r for calculating an absolute-value average M4s only of systematic bits after combining; a post-combination parity-bit average-value calculation unit 12s for calculating an absolute-value average M4p only of parity bits after combining; a post-combination weighted-average calculation unit 12t for obtaining an overall average value M4 by performing multiplication using a weighting coefficient α (α>0) in the manner indicated by the following equation:

$$M4=\alpha \cdot M4s+(1-\alpha) \cdot M4p \quad (1)$$

in such a manner that the average value M4s of the systematic bits will become advantageous; and the post-combination quantizer 12j for performing quantization upon deciding quantization levels using the average value M4 multiplied by a predetermined magnification as the quantization range, and inputting the quantized signal to the error-correcting decoder 12k. In the equation cited above, α is the weighting coefficient and a value greater than 0.5 is selected as the coefficient α in order to give preference to the systematic bits.

The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the transmitter 11 via a transmitting unit (not shown).

If decoding can be performed correctly, the data that has been stored in the H-ARQ buffer 12f is cleared from the buffer. If decoding cannot be performed correctly, then the stored data in the H-ARQ buffer 12f is updated by the H-ARQ combined signal.

In accordance with the second embodiment, the quantization reference (quantization range) is decided upon obtaining the overall average value M4 by applying the weighting coefficient α in such a manner that the average value M4s of the systematic bits becomes more advantageous than the average value M4p of the parity bits. As a result, loss of information of the systematic bits can be prevented to the maximum degree.

(D) Third Embodiment

Figure 5:
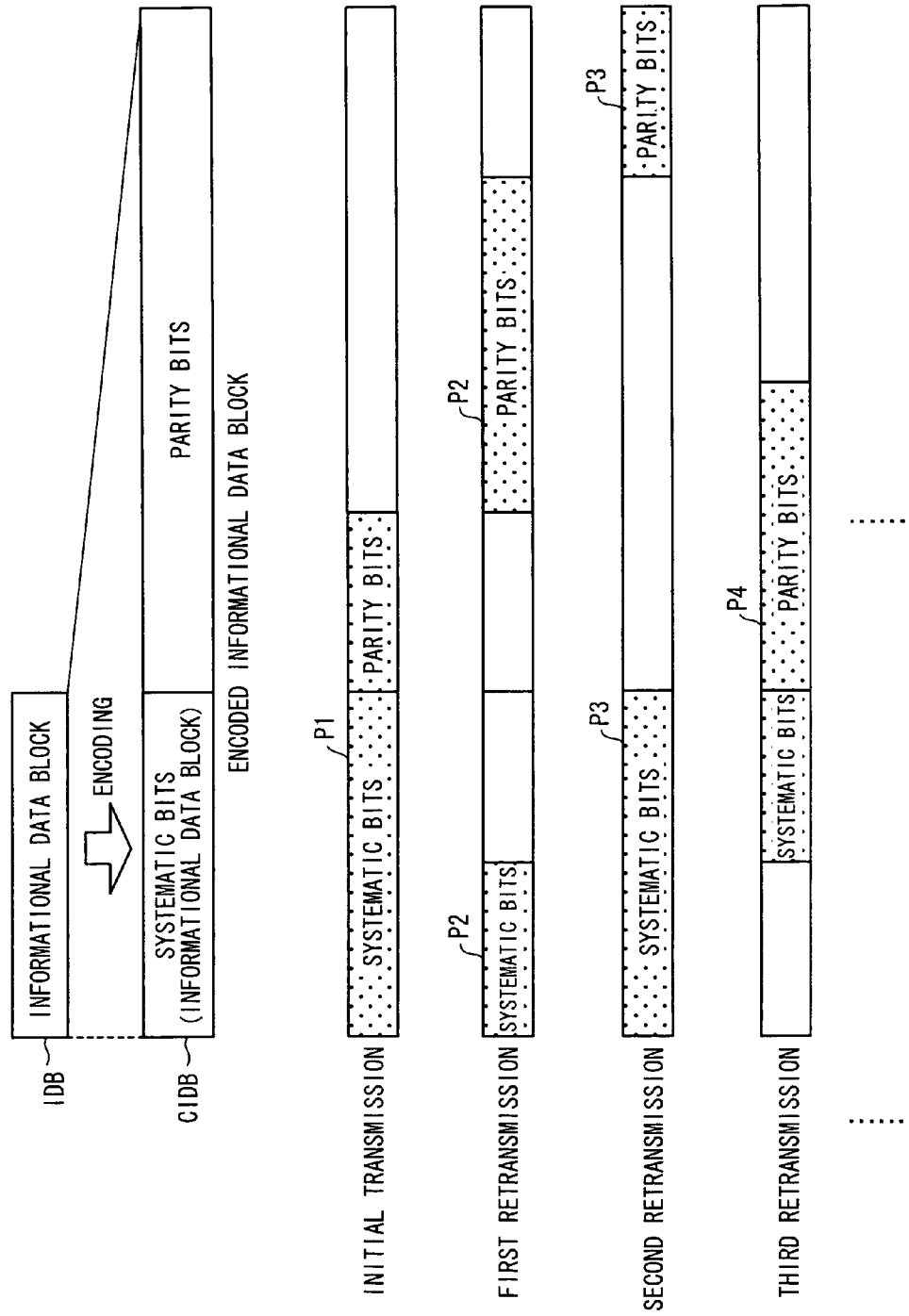
FIG. 5 illustrates another example of retransmission patterns.
Figure 6:
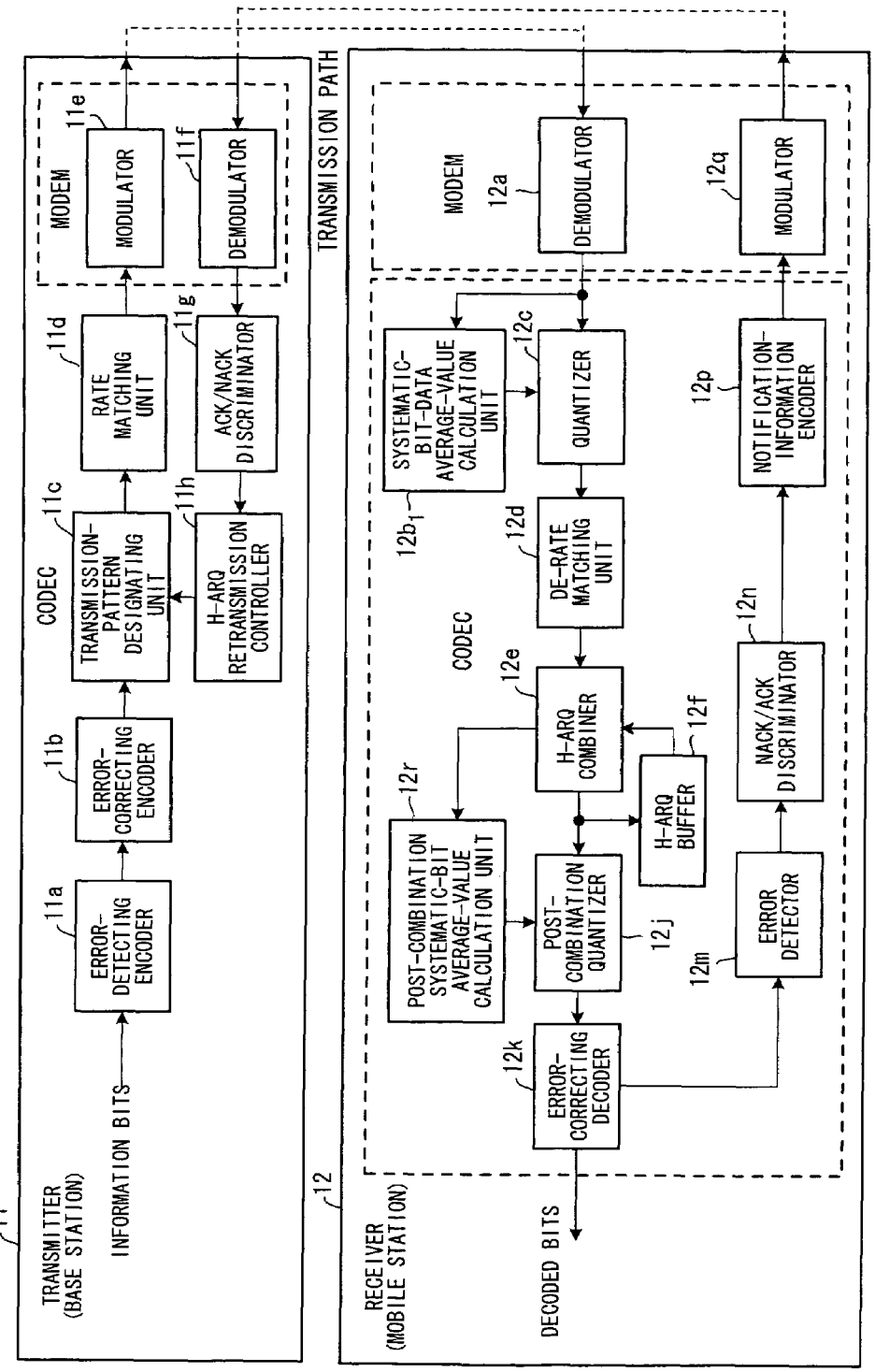
FIG. 6 is a block diagram of a transceiver according to a third embodiment of the present invention.

A third embodiment of the invention is constituted by a system the basis of which is a channel that supports HSDPA (High-Speed Downlink Packet Access) compliant with 3GPP Release 5. Here a base station and mobile station correspond to the transmitter and receiver, respectively. FIG. 5 illustrates an example of retransmission patterns, and FIG. 6 is a block diagram of a transceiver according to the third embodiment, in which components identical with those of the second embodiment of FIG. 4 are designated by like reference characters.

The H-ARQ method, which is one HSDPA technique, is used as an HS-DSCH (High-Speed Downlink Shared Channel) in a W-CDMA system compliant with 3GPP Release 5. When the base station 11 initially transmits an information bit block (transport block) of the HS-DSCH transport channel, the base station executes a series of encoding processes (appending of CRC parity and execution of turbo encoding processing), executes rate matching and QPSK or 16QAM signal-modulation processing and transmits the resultant signal via a radio propagation path. It should be noted that the base station 11 takes currently utilizable resources into consideration, selects a suitable format from among formats stipulated by the specifications and decides the transport-block size, the modulation scheme of the radio channel and size of the transport bits in accordance with the format selected. These decide the rate matching rate. In a case where the bit size of the radio channel is less than the size of the encoded bits, rate matching becomes processing (puncturing processing) for selecting only some of all encoded bits. In a case where H-ARQ is applied, a set of bits to be transmitted is selected in accordance with the stipulated scheduling method in this puncturing processing.

The mobile station 12 includes the demodulator 12a of the modem for demodulating the receive data and outputting the demodulated data as likelihood (soft-decision) data; the average-value calculation unit 12b for calculating the average value of the amplitudes of the soft-decision demodulated data and deciding the quantization range and quantization levels; a systematic-bit-data average-value calculation unit 12b1 of the codec which, since a receive packet always contains systematic bits (see FIG. 5), obtains the average value of absolute values of the systematic bits contained in likelihood data (it is assumed below that the average value of the data is the average value of the absolute values of the data).

The quantizer 12c adopts the result of multiplying the average value by a constant as the maximum value of amplitude and replaces data that exceeds this maximum value with the maximum value. The quantizer 12c divides the range of the likelihood data into stages (quantization levels) of fixed width, correlates the data contained in each stage with a corresponding quantization code and inputs the result to the de-rate matching unit 12d. The latter executes processing that is the reverse of rate matching on the transmitting side. The H-ARQ buffer 12f stores packet data that failed to be decoded the last time data was received, and the H-ARQ combiner 12e combines, by a method similar to that of the first embodiment, data that has been stored in the H-ARQ buffer 12f and retransmission data just received. The post-combination systematic-bit average-value calculation unit 12r calculates the absolute-value average M4s only of systematic bits contained in the combined signal, and the post-combination quantizer 12j performs quantization upon deciding quantization levels using a constant multiplier of the average value M4s as the quantization range, and inputs the quantized signal to the error-correcting decoder 12k.

The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the transmitter 11 via a transmitting unit (not shown).

If decoding can be performed correctly, the data that has been stored in the H-ARQ buffer 12f is cleared from the buffer. If decoding cannot be performed correctly, then the stored data in the H-ARQ buffer 12f is updated by the H-ARQ combined signal.

The ACK/NACK indicating whether the result of decoding is acceptable or not is appended to the uplink HS-DPCCH (High-Speed Dedicated Physical Control Channel) and the resultant signal is transmitted toward the base station 11.

The base station 11 receives and decodes the HS-DPCCH. If NACK is detected, then the base station 11 selects and retransmits, by a stipulated method, a combination of new bits from the encoded block regarding the present transport block. The mobile station 12 receives the retransmitted data and repeats the above-described processing.

In accordance with the third embodiment, quantization is performed upon deciding a quantization reference (quantization range) using the average value of systematic bits. The information possessed by the systematic bits, therefore, is not lost. Further, since systematic bits and parity bits are contained in a packet, the average value of the packet is substantially the same level as that of the average value of the systematic bits, loss of information of parity bits is prevented to the maximum degree and quantization can be executed in optimum fashion.

(E) Fourth Embodiment

Figure 7:
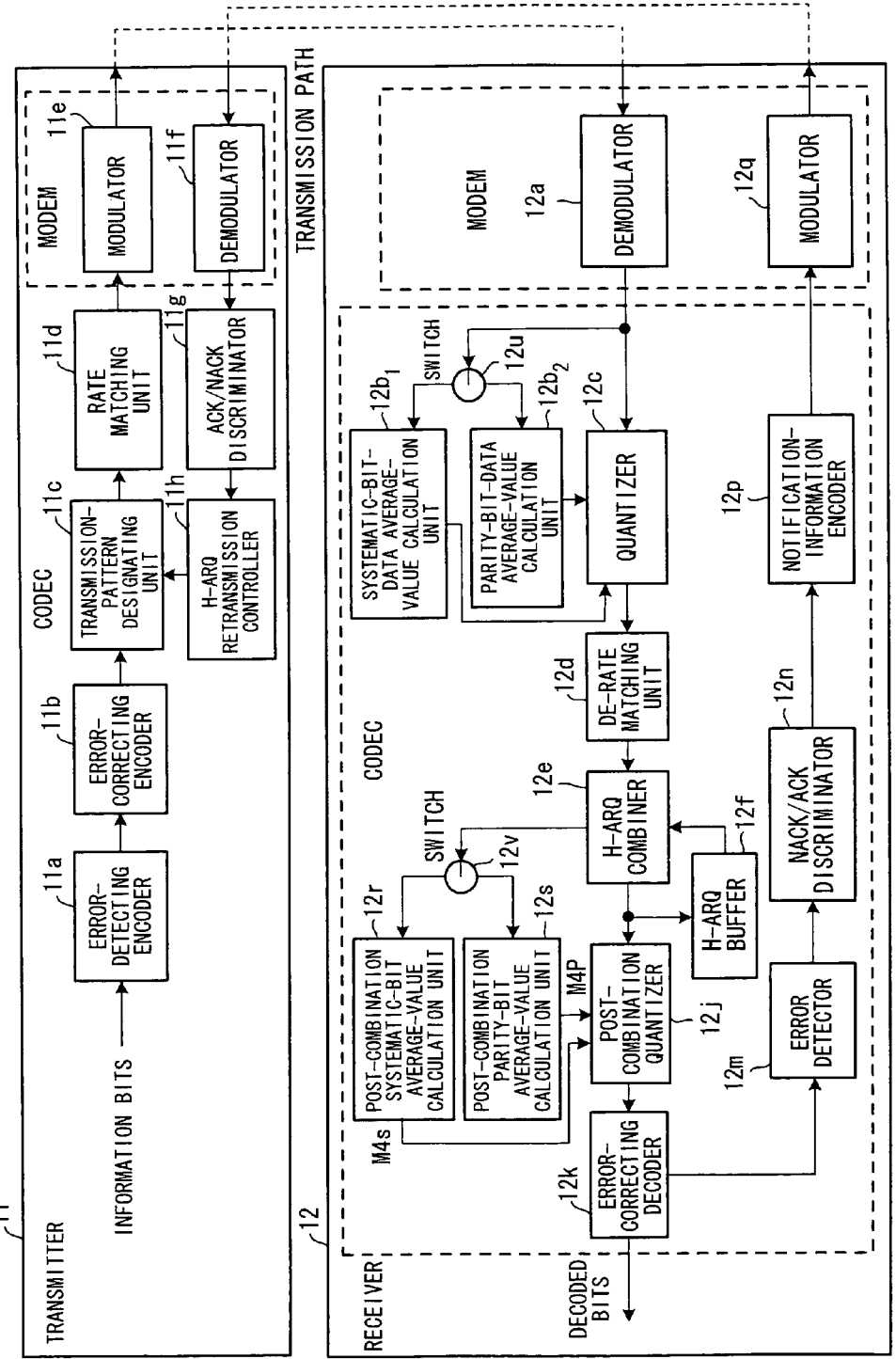
FIG. 7 is a block diagram of a transceiver according to a fourth embodiment of the present invention.

Packets (see FIG. 5) in the retransmission patterns of the third embodiment always contain systematic bits. However, there are instances where packets in the retransmission patterns of FIG. 3 do not contain systematic bits. A fourth embodiment of the present invention deals with a case where retransmission is performed in accordance with the retransmission patterns of FIG. 3. FIG. 7 is a block diagram of a transceiver according to the fourth embodiment, in which components identical with those of the third embodiment of FIG. 6 are designated by like reference characters.

The demodulator 12a of the modem in the receiver 12 demodulates the receive data and inputs the demodulated data to the codec as likelihood (soft-decision) data. The codec has a switch 12u for selectively applying the input data to the systematic-bit-data average-value calculation unit 12b1 and a parity-bit-data average-value calculation unit 12b2 depending upon whether a packet is a packet containing systematic bits or a packet containing parity bits.

If packets are packets P1, P3 containing systematic bits (FIG. 3), the systematic-bit-data average-value calculation unit 12b1 obtains the average value of amplitudes of the systematic bits. The quantizer 12c decides the quantization levels using the result of multiplying the average value by a constant as the amplitude range, quantizes the input signal and inputs the quantized signal to the de-rate matching unit 12d. On the other hand, if packets are packets P2, P4 containing parity bits, the parity-bit-data average-value calculation unit 12b2 obtains the average value of amplitudes of the parity bits. The quantizer 12c decides the quantization levels using the result of multiplying the average value by a constant as the amplitude range, quantizes the input signal and inputs the quantized signal to the de-rate matching unit 12d.

The de-rate matching unit 12d executes processing that is the opposite of rate matching on the transmitting side. The H-ARQ buffer 12f stores packet data that failed to be decoded the last time data was received, and the H-ARQ combiner 12e combines, by a method similar to that of the first embodiment, data that has been stored in the H-ARQ buffer 12f and retransmission data just received. A switch 12v selectively inputs the combined signal to the post-combination systematic-bit average-value calculation unit 12r and post-combination parity-bit average-value calculation unit 12s depending upon whether the combined signal contains systematic bits.

If the combined signal does not contain systematic bits, the post-combination parity-bit average-value calculation unit 12s calculates the average value M4p of parity bits contained in the combined signal, and the post-combination quantizer 12j performs quantization upon deciding quantization levels using a constant multiplier of the average value M4s as the quantization range, and inputs the quantized signal to the error-correcting decoder 12k.

The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the transmitter 11 via a transmitting unit (not shown).

The fourth embodiment is such that if a packet does not contain systematic bits, quantization is performed upon deciding the quantization range using the average value of parity bits. As a result, parity bits can be identified correctly. If a packet does contain systematic bits, quantization is performed upon deciding the quantization range using the average value of systematic bits. As a result, information possessed by systematic bits will not be lost.

Figure 8:
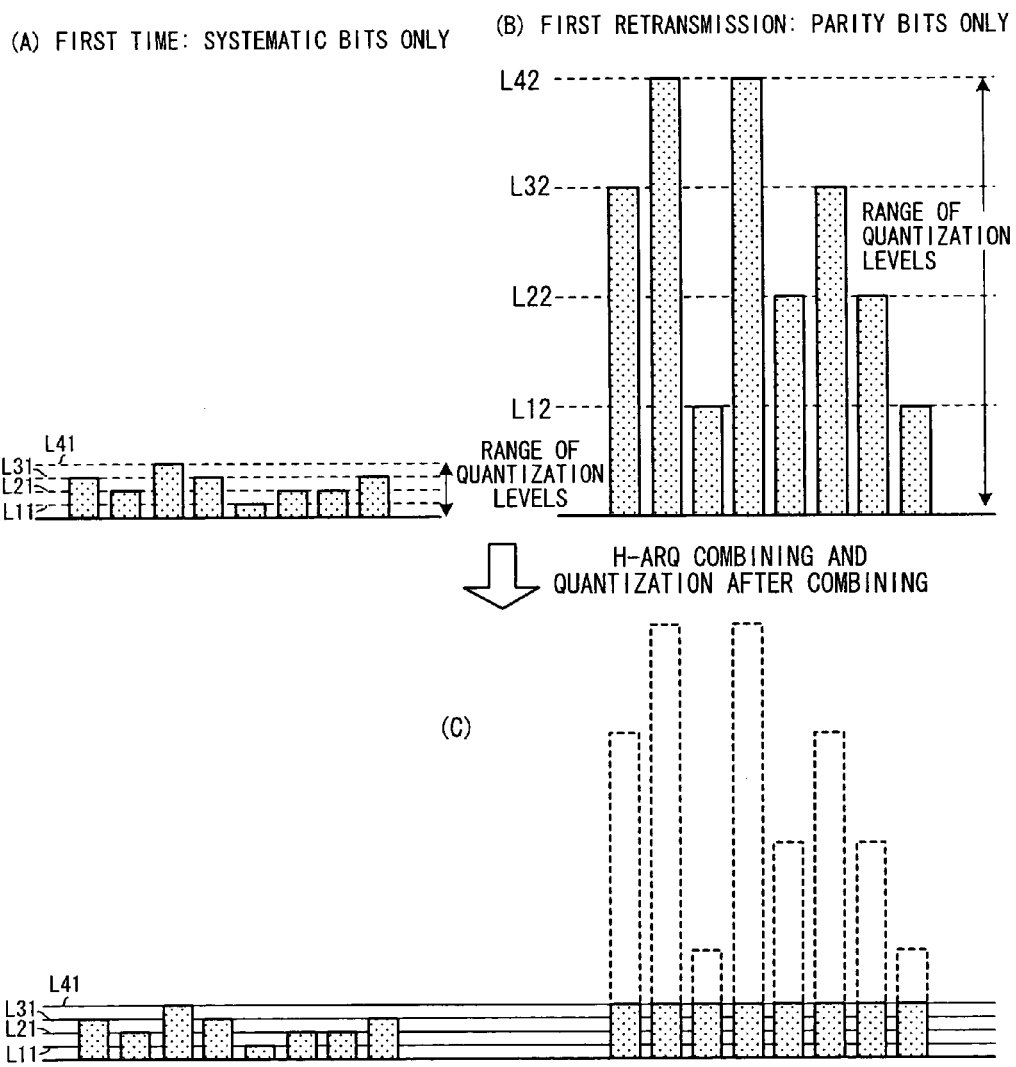
FIG. 8 is a diagram useful in describing the effects of the fourth embodiment.

FIG. 8 is a diagram useful in describing the effects of the fourth embodiment in a case where retransmission is performed according to the retransmission patterns shown in FIG. 3. This is a case where packet P1 containing only systematic bits indicated at (A) is received first followed by receipt of the retransmission packet P2 of parity bits. The quantization levels of the quantizer 12c of receiver 12 become L11 to L41 when the packet P1 of only systematic bits at (A) has been received and become L12 to L42 when the retransmission packet P2 at (B) has been received. On the other hand, the quantization levels of the post-combination quantizer 12j become L11 to L41 when the packet P1 of only systematic bits at (A) has been received and become L11 to L41, as indicated at (C), also when the retransmission packet P2 at (B) has been received. As a result, the systematic bits are maintained without loss of their information. It should be noted that the parity bits are such that information that exceeds the quantization range is lost.

If (C) of FIG. 8 in the fourth embodiment and (C) of FIG. 28 according to the prior art are compared, it will be understood that according to the fourth embodiment, the information possessed by the systematic bits, which are of greater importance than the parity bits, is preserved as is. Further, the information possessed by the parity bits is lost but the hard-decision information (most significant code bit) remains.

Figure 9:
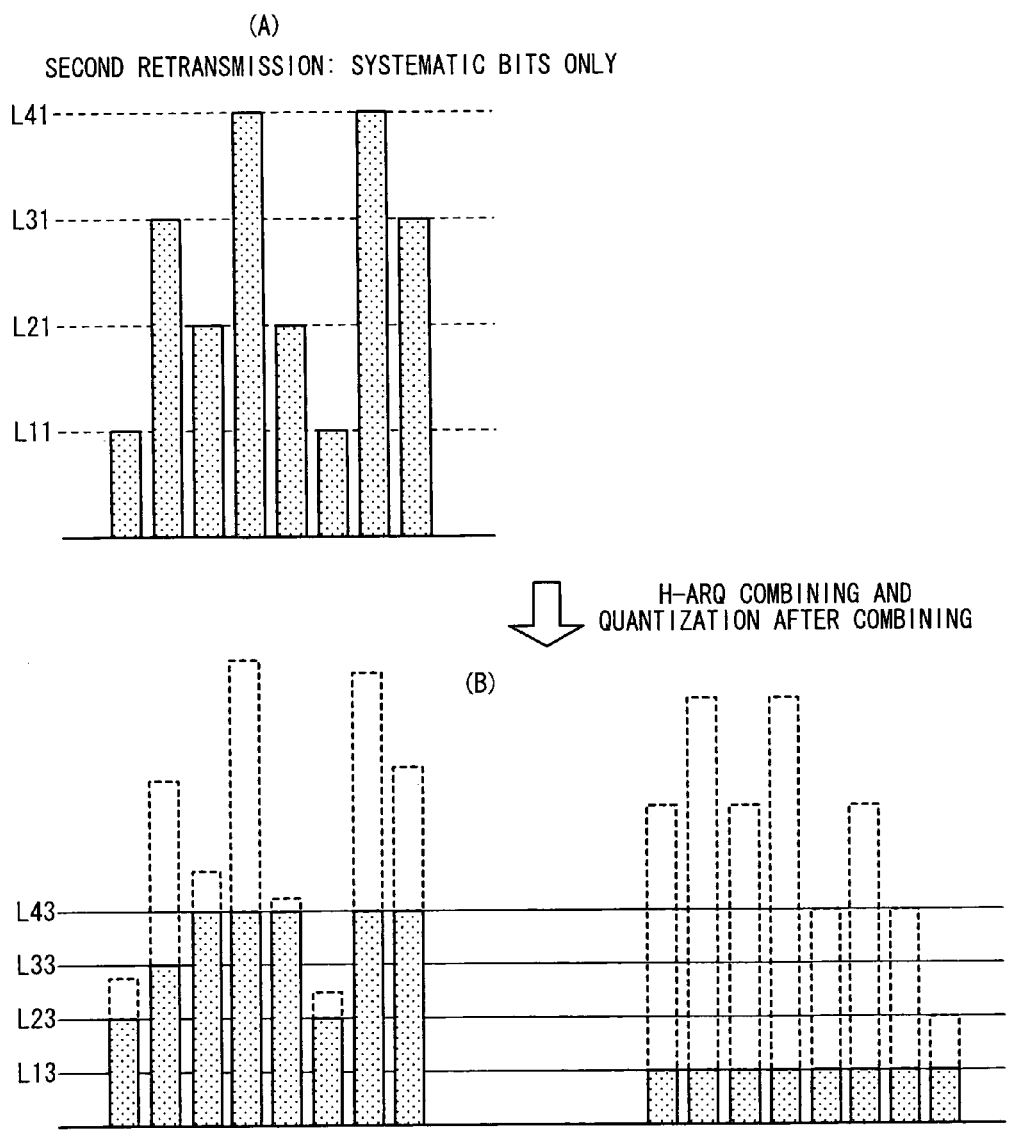
FIG. 9 is a diagram useful in describing quantization levels when a packet P3 of systematic bits of large amplitude level is received in a second retransmission.

FIG. 9 is a diagram useful in describing quantization levels when the packet P3 of systematic bits of large amplitude level is received in a second retransmission. If the retransmission packet P3 has been received, the quantization levels of the quantizer 12c of receiver 12 become L11 to L41, as indicated at (A) in FIG. 9, and the quantization levels of the post-combination quantizer 12j are averaged and become L13 to L43, as indicated at (B) in FIG. 9. Since the quantization levels of the post-combination quantizer 12j are enlarged, the parity bits that enter the decoder become 11111111 and information is lost.

Thus, in accordance with the fourth embodiment, an advantage is that the information possessed by the systematic bits is preserved and not lost. A problem, however, is that the information of the parity bits is lost. Nevertheless, since the systematic bits are more important, the effects of reproduction and combination are greater than in the prior art.

(F) Fifth Embodiment

Figure 10:
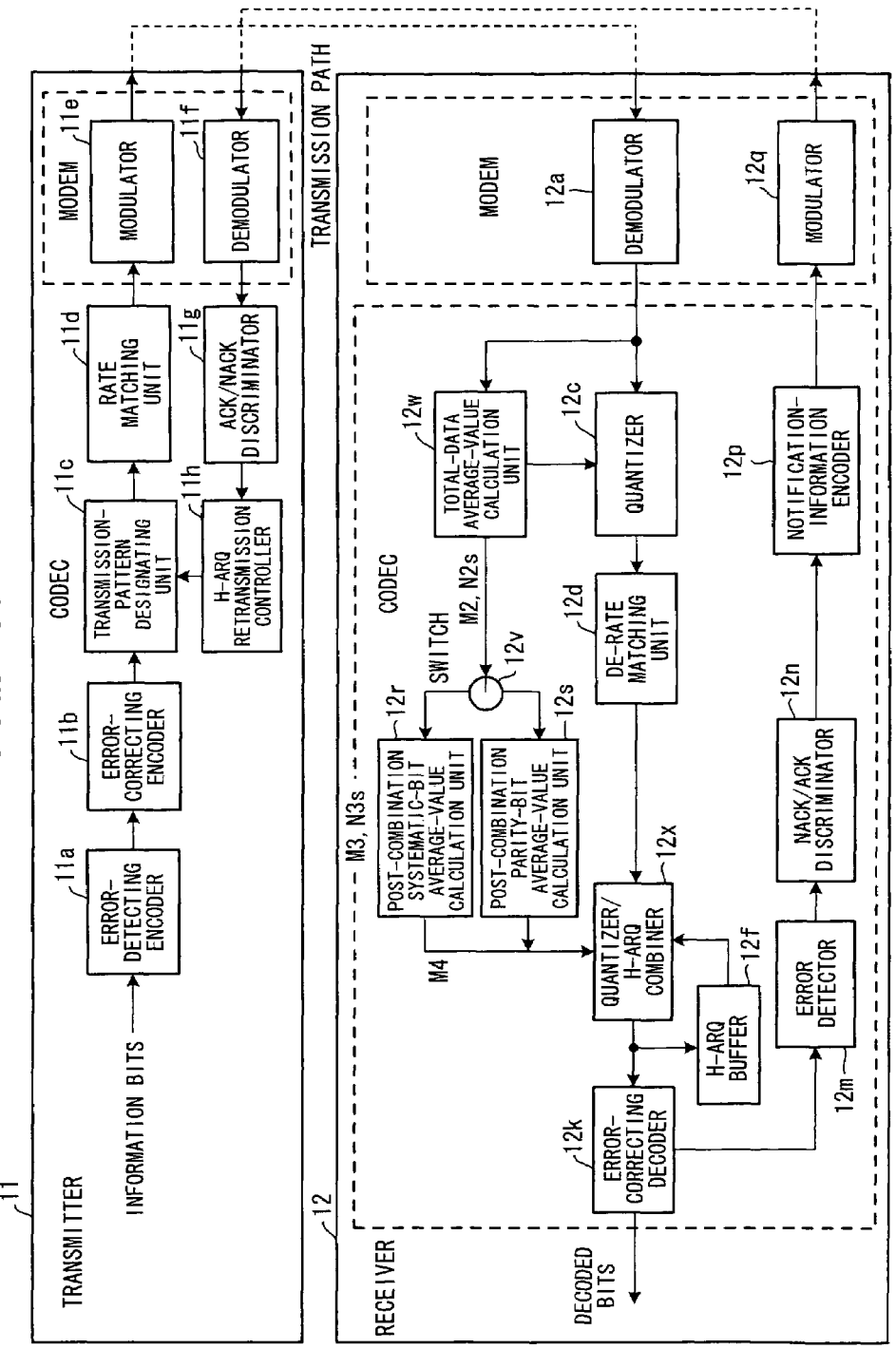
FIG. 10 is a block diagram of a transceiver according to a fifth embodiment of the present invention.

FIG. 10 is a block diagram of a transceiver according to a fifth embodiment of the present invention, which deals with a case where retransmission is performed in accordance with the retransmission patterns of FIG. 3. Components identical with those of the fourth embodiment of FIG. 7 are designated by like reference characters.

The demodulator 12a of the modem in the receiver 12 demodulates the receive data and inputs the demodulated data to the codec as likelihood (soft-decision) data. A total-data average-value calculation unit 12w obtains the average value of all bits, packet by packet, irrespective of whether bits are systematic bits or parity bits. The quantizer 12c decides the quantization levels using the result of multiplying the average value by a constant as the amplitude range, quantizes the input signal and inputs the quantized signal to the de-rate matching unit 12d.

The switch 12v inputs the average value to the post-combination parity-bit average-value calculation unit 12s if a packet is one containing only parity bits, and inputs the average value to the post-combination systematic-bit average-value calculation unit 12r if a packet is one containing only systematic bits.

When the average value is input thereto, the post-combination parity-bit average-value calculation unit 12s calculates the average value of the parity bits, and the post-combination systematic-bit average-value calculation unit 12r calculates, in accordance with the following equation, the average value of the systematic bits after combining is performed:

$$M4 = (N2s \cdot M2 + N3s \cdot M3)/N4s \qquad (2)$$

In Equation (2), M2, M3 and M4 represent the average values of newly received data, stored data and data after combining, respectively, and N2s, N3s and N4s represent the numbers of items of data of systematic bits contained in the newly received data, stored data and data after combining, respectively. Further, M4 is stored in the post-combination systematic-bit average-value calculation unit 12r as M3 prevailing at the time of the next retransmission. That is, the post-combination systematic-bit average-value calculation unit 12r obtains the average value of the systematic bits by calculation based upon Equation (2).

The de-rate matching unit 12d executes processing that is the reverse of rate matching on the transmitting side and inputs the processed signal to a quantizer/H-ARQ combiner 12x. The H-ARQ buffer 12f stores packet data that failed to be decoded the last time data was received, and the quantizer/H-ARQ combiner 12x combines, by a method similar to that of the first embodiment, data that has been stored in the H-ARQ buffer 12f and retransmission data just received. Further, if the combined signal does not contain systematic bits, then the quantizer/H-ARQ combiner 12x performs quantization upon deciding quantization levels using, as the quantization range, a constant multiplier of the average value that enters from the post-combination parity-bit average-value calculation unit 12s and inputs the quantized signal to the error-correcting decoder 12k. If the combined signal does contain systematic bits, on the other hand, then the quantizer/H-ARQ combiner 12x performs quantization upon deciding quantization levels using, as the quantization range, a constant multiplier of the average value M4 obtained by Equation (2) and input from the post-combination parity-bit average-value calculation unit 12s, and inputs the quantized signal to the error-correcting decoder 12k.

The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the transmitter 11 via a transmitting unit (not shown).

In accordance with the fifth embodiment, the quantization range is decided in accordance with Equation (2). As a result, it is possible to reduce the amount of average-value calculation processing for deciding the quantization range. Further, the fifth embodiment is such that if a packet does not contain systematic bits, quantization is performed upon deciding the quantization range using the average value of parity bits. As a result, parity bits can be identified correctly. If a packet does contain systematic bits, quantization is performed upon deciding the quantization range using the average value of systematic bits found according to Equation (2). As a result, information possessed by systematic bits will not be lost.

In the fifth embodiment, effects and problems similar to those of the fourth embodiment can be described with reference to FIGS. 8 and 9. Thus, in accordance with the fifth embodiment, average-value calculation processing for deciding the quantization range can be reduced. A further advantage is that the information of the systematic bits is preserved and not lost. Though a problem is that the information possessed by the parity bits is lost, the systematic bits are more important and therefore the effects of reproduction and combination are greater than in the prior art.

(G) Sixth Embodiment

Figure 11:
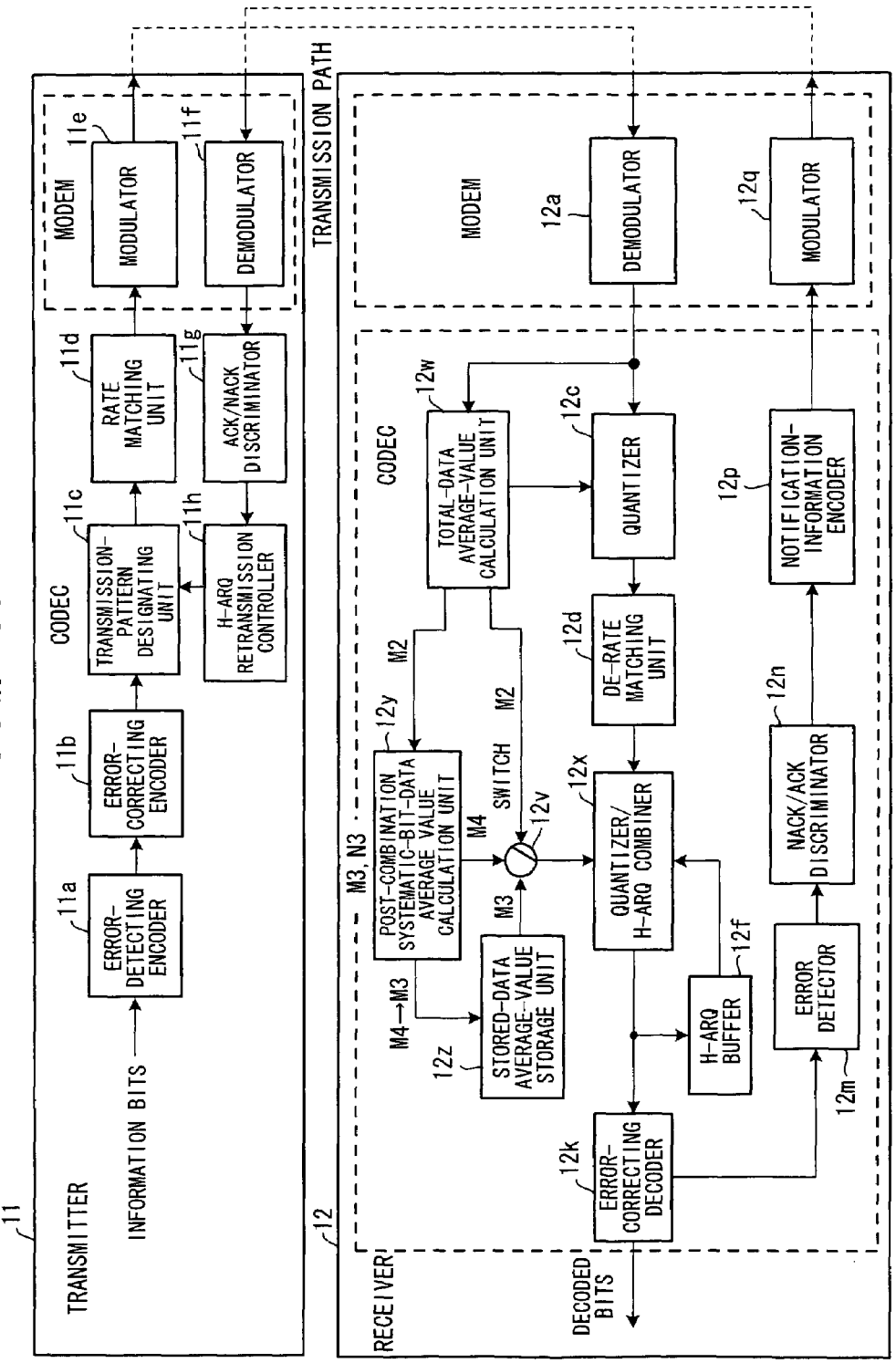
FIG. 11 is a block diagram of a transceiver according to a sixth embodiment of the present invention.

FIG. 11 is a block diagram of a transceiver according to a sixth embodiment of the present invention, which deals with a case where retransmission is performed in accordance with the retransmission patterns of FIG. 3. Components identical with those of the fifth embodiment of FIG. 10 are designated by like reference characters.

The demodulator 12a of the modem in the receiver 12 demodulates the receive data and inputs the demodulated data to the codec as likelihood (soft-decision) data. The total-data average-value calculation unit 12w obtains the average value of all bits, packet by packet, irrespective of whether bits are systematic bits or parity bits. The quantizer 12c decides the quantization levels using the result of multiplying the average value by a constant as the amplitude range, quantizes the input signal and inputs the quantized signal to the de-rate matching unit 12d. The de-rate matching unit 12d executes processing that is the reverse of rate matching on the transmitting side and inputs the processed signal to the quantizer/H-ARQ combiner 12x. A post-combination systematic-bit-data average-value calculation unit 12y obtains the average value of all data, in accordance with the following equation, after the combining operation:

$$M4 = (N2s \cdot M2 + N3 \cdot M3)/N4 \qquad (3)$$

where M2, M3 and M4 represent the average values of newly received data, stored data and data after combining, respectively, and N2, N3 and N4 represent the total numbers of items of received data of the newly received data, stored data and data after combining, respectively. Further, M4 is stored in the post-combination systematic-bit average-value calculation unit 12r as M3 prevailing at the time of the next retransmission. The switch 12v (1) selects the average value M2 or M3 (the latter of which has been stored in an average-value storage unit 12z), which is on the side having the data of the systematic bits, in a case where only one of the newly received data and stored data possesses data composed of systematic bits, (2) selects the average value M4, which has been calculated in accordance with Equation (3), in a case where both the newly received data and stored data possess average-value data composed of systematic bits, and (3) selects the average value of newly received data (the average value of parity bits) in a case where neither the newly received data nor the stored data possess average-value data composed of systematic bits. The switch 12v inputs the selected average value to the quantizer/H-ARQ combiner 12x.

The quantizer/H-ARQ combiner 12x combines, by a method similar to that of the first embodiment, data that has been stored in the H-ARQ buffer 12f and retransmission data just received. In addition, the quantizer/H-ARQ combiner 12x quantizes the combined signal upon deciding the quantization levels using the result of multiplying the average value that enters from the switch 12v by a constant as the amplitude range, and inputs the quantized signal to the error-correcting decoder 12k.

The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the transmitter 11 via a transmitting unit (not shown).

Effects and problems can be described in the sixth embodiment as well with reference to FIGS. 8 and 9 in a manner similar to that of the fourth embodiment.

Thus, in accordance with the sixth embodiment, it is possible to reduce the amount of processing for calculating average value because the quantization range is decided by (1) to (3) above. Further, the fifth embodiment is such that if a packet does not contain systematic bits, quantization is performed upon deciding the quantization range using the average value of parity bits. As a result, parity bits can be identified correctly. Furthermore, information possessed by systematic bits will not be lost because quantization is performed upon deciding a quantization range using the average value of systematic bits found according to Equation (3). Though a problem is that the information possessed by the parity bits is lost, the systematic bits are more important and therefore the effects of reproduction and combination are greater than in the prior art.

(H) Seventh Embodiment

Figure 12:
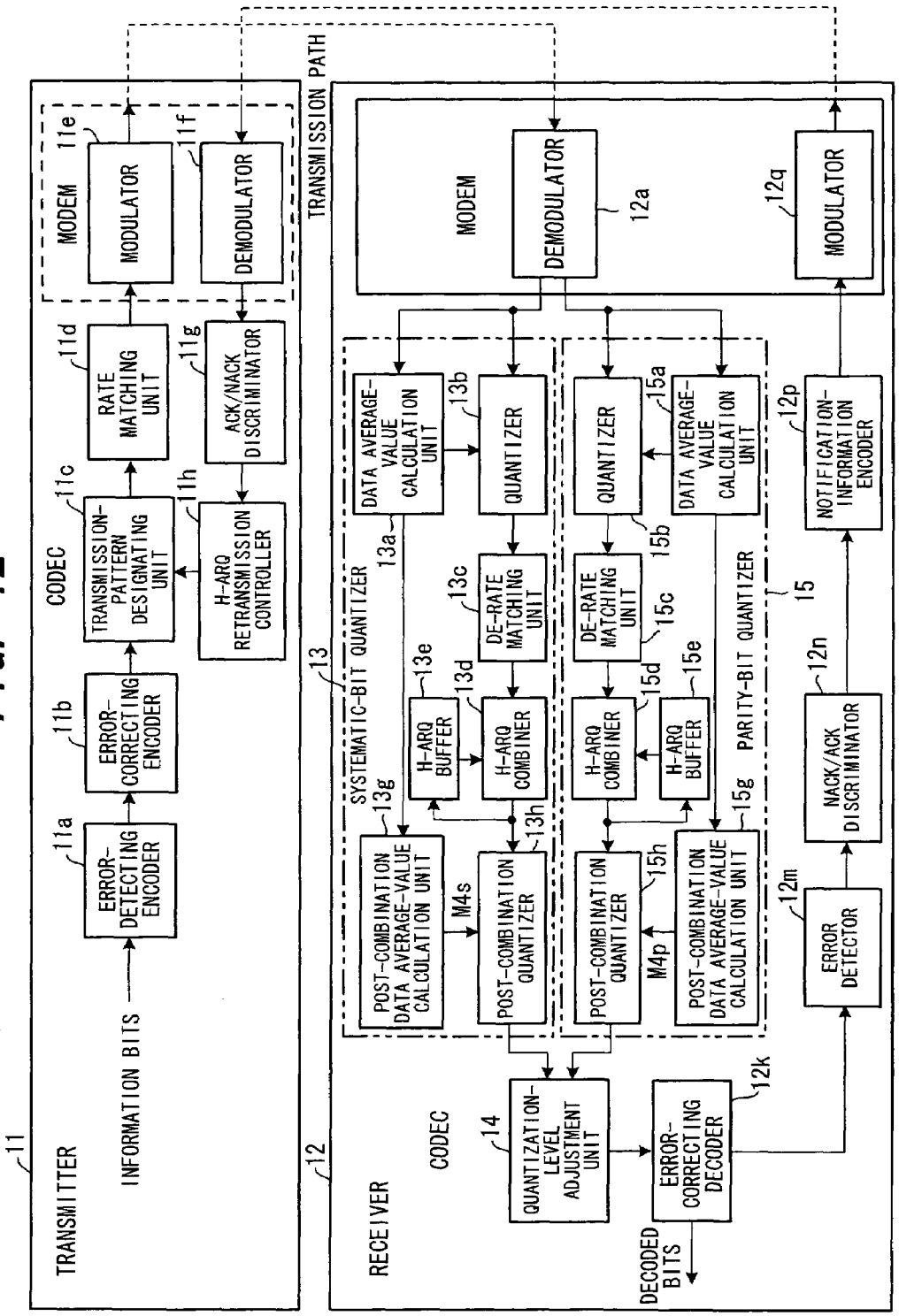
FIG. 12 is a block diagram of a transceiver according to a seventh embodiment of the present invention.
Figure 13:
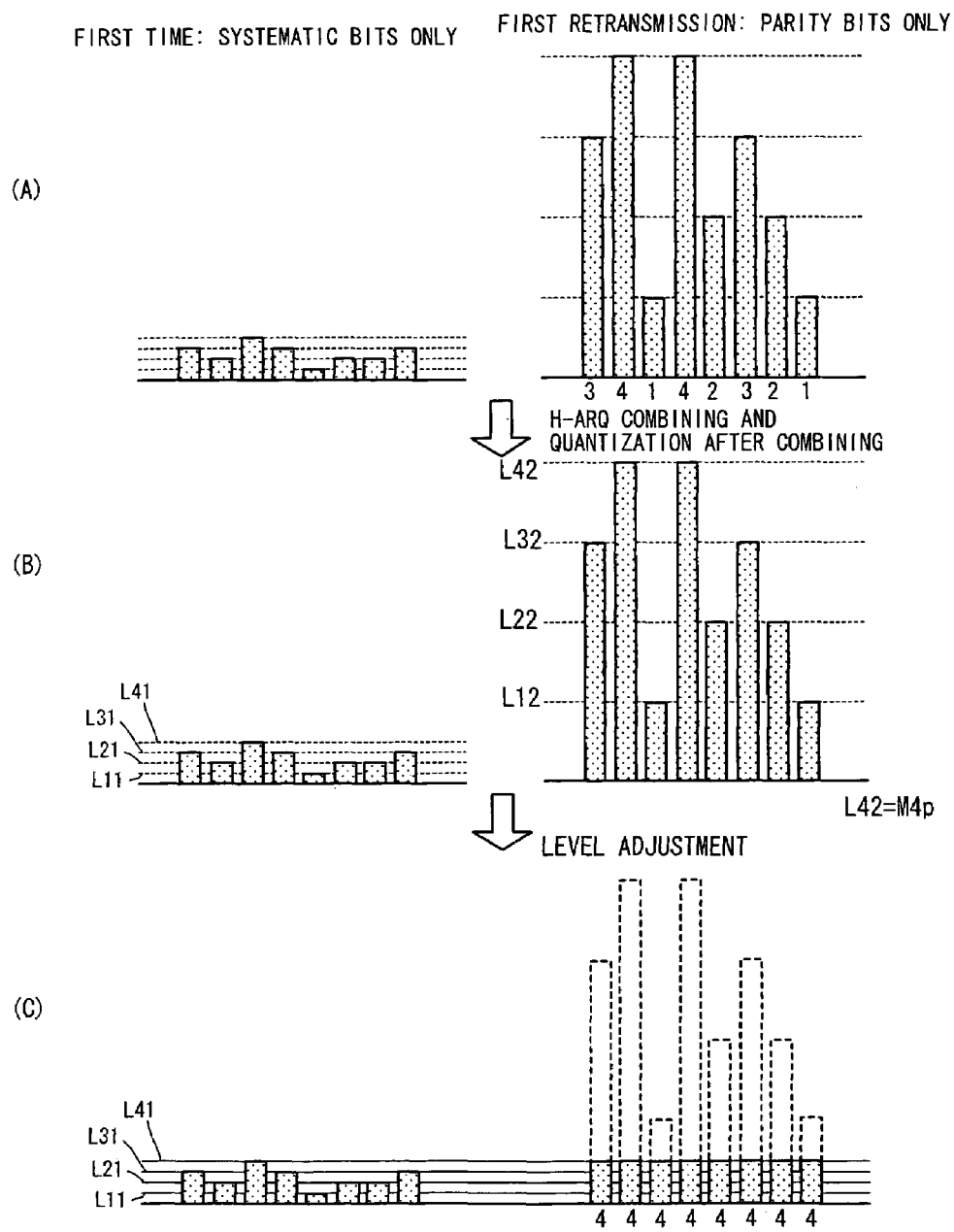
FIG. 13 is a diagram useful in describing effects in a case where retransmission data is sent and received in the seventh embodiment in accordance with the retransmission patterns of FIG. 3.
Figure 14:
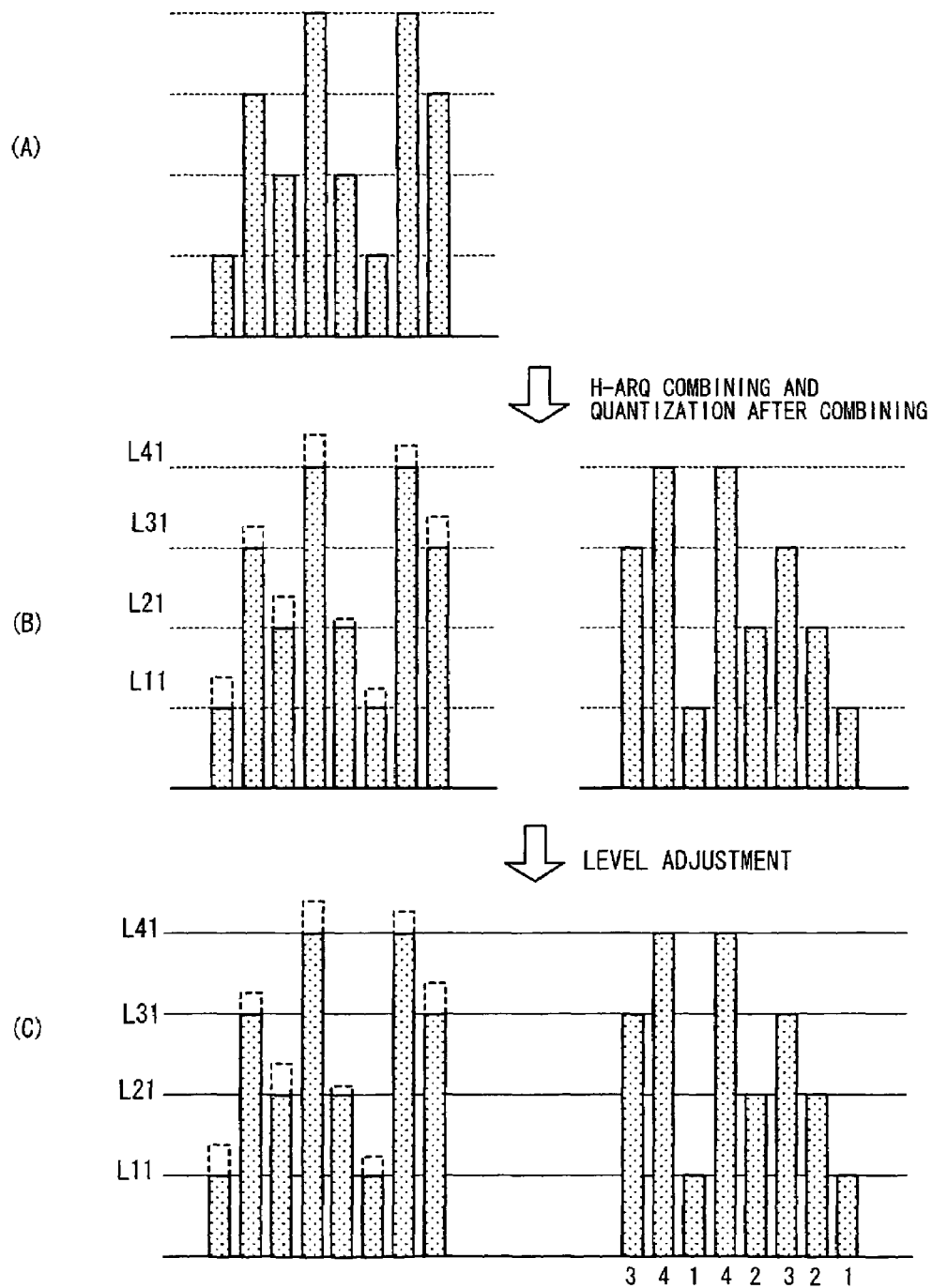
FIG. 14 is another diagram useful in describing effects in a case where retransmission data is sent and received in the seventh embodiment in accordance with the retransmission patterns of FIG. 3.

FIG. 12 is a block diagram of a transceiver according to a seventh embodiment of the present invention, and FIGS. 13 and 14 are diagrams useful in describing effects in a case where retransmission data is sent and received in the seventh embodiment in accordance with the retransmission patterns of FIG. 3. In the seventh embodiment, average values of systematic bits and of parity bits are calculated independently, quantization ranges and quantization levels are decided independently based upon the average values and a level adjustment is performed when these are input to an encoder.

The transmitter (base station) 11 transmits packets by exercising control similar to that of the first embodiment and, when retransmission is performed, sends and receives retransmission data (packets) in accordance with the retransmission patterns of FIG. 3. The demodulator 12a in the receiver (mobile station) 12 demodulates the data of a receive packet, inputs the packet to a systematic-bit quantizer 13 as likelihood (soft-decision) data if the packet is composed of systematic bits, and inputs the packet to a parity-bit quantizer 15 if the packet is composed of parity bits.

The systematic-bit quantizer 13 has a data average-value calculation unit 13a for obtaining the average value of absolute values of systematic bits, and a quantizer 13b for adopting the result of multiplying the average value by a constant as the maximum value of amplitude and replacing data that exceeds this maximum value with the maximum value. The quantizer 13b divides the range of the likelihood data into stages (quantization levels) of fixed width, as indicated at (A) of FIG. 13, correlates the data contained in each stage with a corresponding quantization code and inputs the result to a de-rate matching unit 13c. The latter executes processing that is the opposite of rate matching on the transmitting side and inputs the result of processing to a H-ARQ combiner 13d. An H-ARQ buffer 13e stores systematic-bit packet data that failed to be decoded the last time data was received, and the H-ARQ combiner 13d combines, by a method similar to that of the first embodiment, systematic-bit data that has been stored in the H-ARQ buffer 13e and systematic-bit retransmission data just received. A post-combination data average-value calculation unit 13g calculates the post-combination absolute-value average M4s of systematic bits using the average value of soft-decision data of systematic bits sent from the data average-value calculation unit 13a, and a post-combination quantizer 13h decides quantization levels L11 to L41 using a constant multiplier of the average value M4s as the quantization range, as illustrated at (B) in FIG. 13, quantizes each item of systematic-bit data of the combined signal and inputs the quantized signal to a quantization-level adjustment unit 14. The post-combination data average-value calculation unit 13g calculates the average value of the systematic bits, in accordance with the following equation, after the combining operation:

$$M4s=(N2s \cdot M2s+N3s \cdot M3s)/N4s \tag{4}$$

where M2s, M3s and M4s represent the average values of newly received data, stored data and data after combining, respectively, these items of data being composed of systematic bits, and N2s, N3s and N4s represent the numbers of items of data of systematic bits contained in the newly received data, stored data and data after combining, respectively.

The parity-bit quantizer 15 has a data average-value calculation unit 15a for obtaining the average value of absolute values of parity bits, and a quantizer 15b for adopting the result of multiplying the average value by a constant as the maximum value of amplitude and replacing data that exceeds this maximum value with the maximum value. The quantizer 15b divides the range of the likelihood data into stages (quantization levels) of fixed width, as indicated at (A) of FIG. 13, correlates the data contained in each stage with a corresponding quantization code and inputs the result to a de-rate matching unit 15c. The latter executes processing that is the reverse of rate matching on the transmitting side and inputs the result of processing to an H-ARQ combiner 15d. An H-ARQ buffer 15e stores parity-bit packet data that failed to be decoded the last time data was received, and the H-ARQ combiner 15d combines parity-bit data that has been stored in the H-ARQ buffer 15e and parity-bit retransmission data just received. A post-combination data average-value calculation unit 15g calculates the post-combination absolute-value average M4p of parity bits using the average value of soft-decision data of parity bits sent from the data average-value calculation unit 15a, and a post-combination quantizer 15h decides quantization levels L12 to L42 using a constant multiplier of the average value M4p as the quantization range, as illustrated at (B) in FIG. 13, quantizes each item of parity-bit data of the combined signal and inputs the quantized signal to the quantization-level adjustment unit 14. The post-combination data average-value calculation unit 15g calculates the average value of the parity bits, in accordance with the following equation, after the combining operation:

$$M4p=(N2p \cdot M2p+N3p \cdot M3p)/N4p \quad (5)$$

where M2p, M3p and M4p represent the average values of newly received data, stored data and data after combining, respectively, these items of data being composed of parity bits, and N2p, N3p and N4p represent the numbers of items of data of parity bits contained in the newly received data, stored data and data after combining, respectively.

When combining and processing the data of the systematic bits and the data of parity bits, the quantization-level adjustment unit 14 combines the data upon performing a level adjustment so as to conform to the systematic-bit quantization method. More specifically, as illustrated at (C) in FIG. 13, the quantization-level adjustment unit 14 adjusts the quantization levels to the quantization levels of the systematic bits, quantizes and combines the parity bits again and inputs the result to the error-correcting decoder 12k. The error-correcting decoder 12k executes error-correcting decoding processing and outputs decoded bits if decoding can be performed correctly. The error detector 12m detects whether or not an error is present based upon the error-detecting code and outputs the result of detection. The NACK/ACK discriminator 12n instructs the notification-information encoder 12p whether to transmit NACK or ACK to the transmitter 11 based upon the result of error detection, the notification-information encoder 12p encodes notification information as instructed, and the modulator 12q modulates the NACK/ACK notification information and transmits the modulated signal to the base station (transmitter) 11 via a transmitting unit (not shown).

If decoding can be performed correctly, the data that has been stored in the H-ARQ buffer 13e is cleared from the buffer. If decoding cannot be performed correctly, then the stored data in the H-ARQ buffer 13e is updated by the H-ARQ combined signal [see (B) in FIG. 13] that is output from the H-ARQ combiner 13d. Further, if decoding can be performed correctly, then the data that has been stored in the H-ARQ buffer 15e is cleared from the buffer. If decoding cannot be performed correctly, then the stored data in the H-ARQ buffer 15e is updated by the H-ARQ combined signal [see (B) in FIG. 13] that is output from the H-ARQ combiner 15d.

If the base station 11 detects NACK, then the base station 11 selects and retransmits, in accordance with a stipulated method, a combination of new bits from the encoded block regarding the present transport block.

The seventh embodiment is such that in a case where the data sizes of the systematic bits and parity bits are sufficiently large and systematic bits and parity bits are mixed in a packet, at the stage in which they are transmitted on the propagation path, owing to data-placement conversion processing such as interleaving, the average values of the systematic bits and of the parity bits are not become markedly different from each other. As a result, the average value of all data can be put to common use.

In FIG. 13, (C) is identical with (C) of FIG. 8. In accordance with the seventh embodiment, effects identical with those of the fourth to sixth embodiments can be obtained. More specifically, in accordance with the seventh embodiment, information possessed by systematic bits, which are more important than parity bits, is preserved as is. Further, the information possessed by the parity bits is lost but the hard-decision information (most significant code bit) remains.

FIG. 14 is a diagram useful in describing quantization levels when the packet of systematic bits of large amplitude level is received in a second retransmission. If a packet having the levels indicated at (A) in FIG. 14 has been received as a packet of systematic bits in a second retransmission, then the quantization levels of the post-combination quantizer 13h are averaged and enlarged, as indicated at (B). In this case, the average value of the parity bits is stored in the H-ARQ buffer 15e, and the quantization levels of the systematic bits and quantization levels of the parity bits become substantially identical. Consequently, even though systematic bits and parity bits are combined upon being level-adjusted by the quantization-level adjustment unit 14, as illustrated at (C) in FIG. 14, the information possessed by parity bits of large amplitude is preserved and not lost, quantization error can be reduced and, as a result, the characteristic is improved and can be made to approach the characteristic of an ideal decoder.

If (B) of FIG. 9 and (C) of FIG. 14 are compared, it will be understood that according to the seventh embodiment, the information possessed by parity bits of large amplitude is not lost and the characteristic is improved.

(I) Eighth Embodiment

In the first to seventh embodiments, the receiver 12 feeds ACK/NACK back to the transmitter 11. If NACK is fed back, the transmitter 11 decides the combination of retransmission data in accordance with a stipulated method and retransmits the data to the receiver 12. However, there are instances where the retransmission data is not always the optimum data. Accordingly, in $8^{th}$ to $11^{th}$ embodiments described below, it is so arranged that information (retransmission-pattern information) possessed by optimum retransmission data judged by the receiver 12 at the time of reception failure is transmitted to the transmitter 11 together with the NACK information, thereby making it possible to execute optimum decoding processing.

Figure 15:
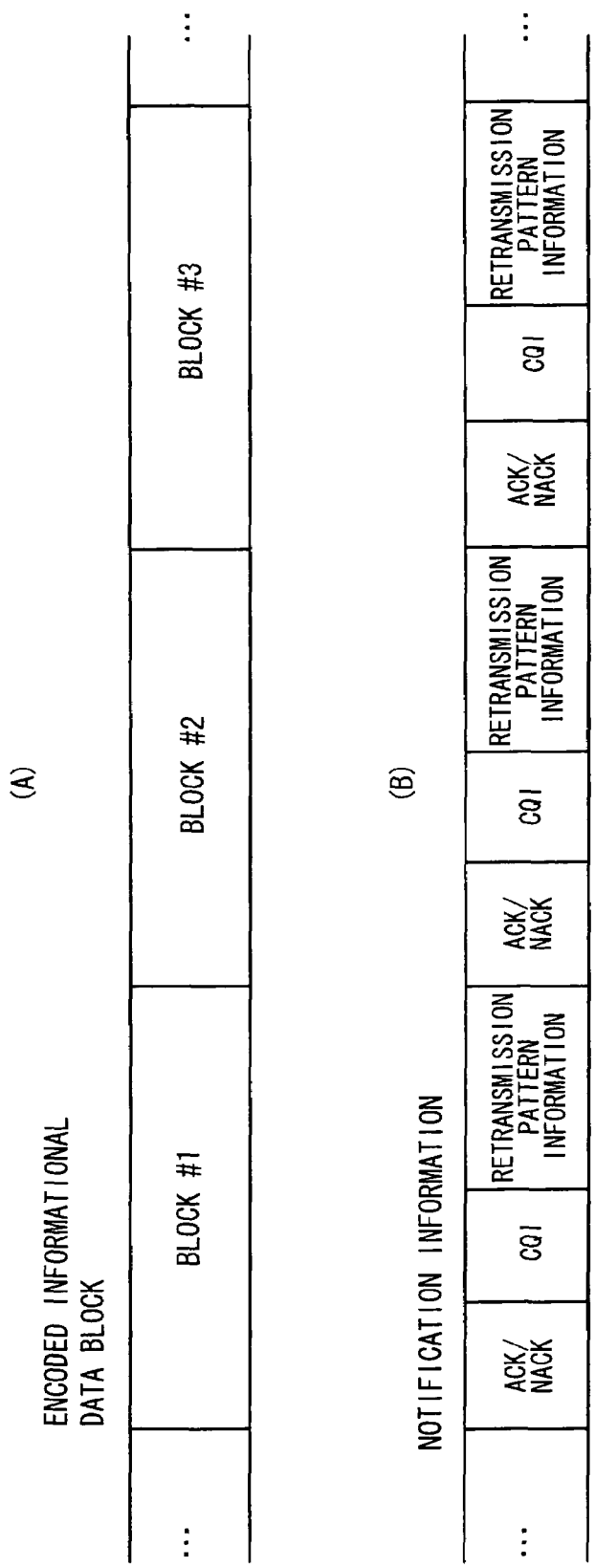
FIG. 15 illustrates an example of the format of encoded informational data blocks transmitted from a transmitter to a receiver and an example of the format of notification information fed back from the receiver to the transmitter.

In FIG. 15, (A) and (B) illustrate an example of the format of encoded informational data blocks transmitted from a transmitter to a receiver and an example of the format of notification information fed back from the receiver to the transmitter in $8^{th}$ to $11^{th}$ embodiment of the invention. The notification information is composed of ACK/NACK information indicating success/failure of decoding, CQI information, which is a signal corresponding to the SN ratio of receive data, and data (retransmission pattern information) that specifies the combination of next retransmission data.

Figure 16:
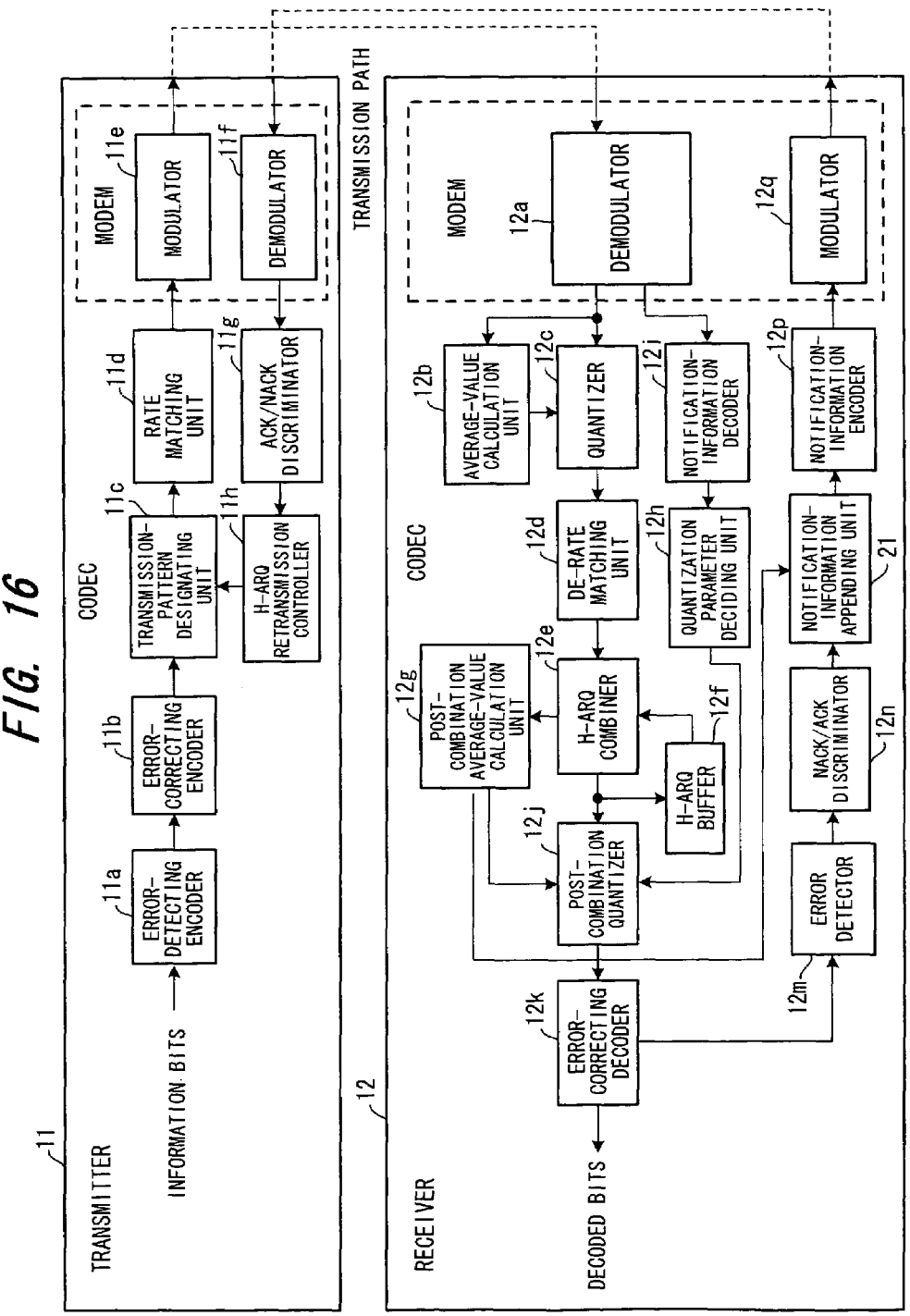
FIG. 16 is a block diagram of a transceiver according to an eighth embodiment of the present invention.

FIG. 16 is a block diagram of a transceiver according to an eighth embodiment of the present invention. This embodiment is obtained by additionally providing the transceiver of the first embodiment of FIG. 2 with a notification-information appending unit 21 for transmitting optimum transmission-data information to the transmitter together with the NACK information.

Assume that packet size is ⅓ of the encoded informational data block. The notification-information appending unit 21 calculates and stores, for every combination of transmit data, the average value, which follows combining of data, of the combinations P1 to P4 (see FIG. 1). When decoding fails and the receiver 12 makes a NACK determination, the receiver applies stipulated weighting to the average values of respective ones of the combinations, compares the weighted averages in terms of size, decides upon the combination for which the average value is smallest as the combination of the next retransmission data, incorporates retransmission pattern information, which specifies this combination, in notification information and transmits the information to the transmitter 11. It should be noted that the weighting mentioned above is not always necessary.

Figure 17:
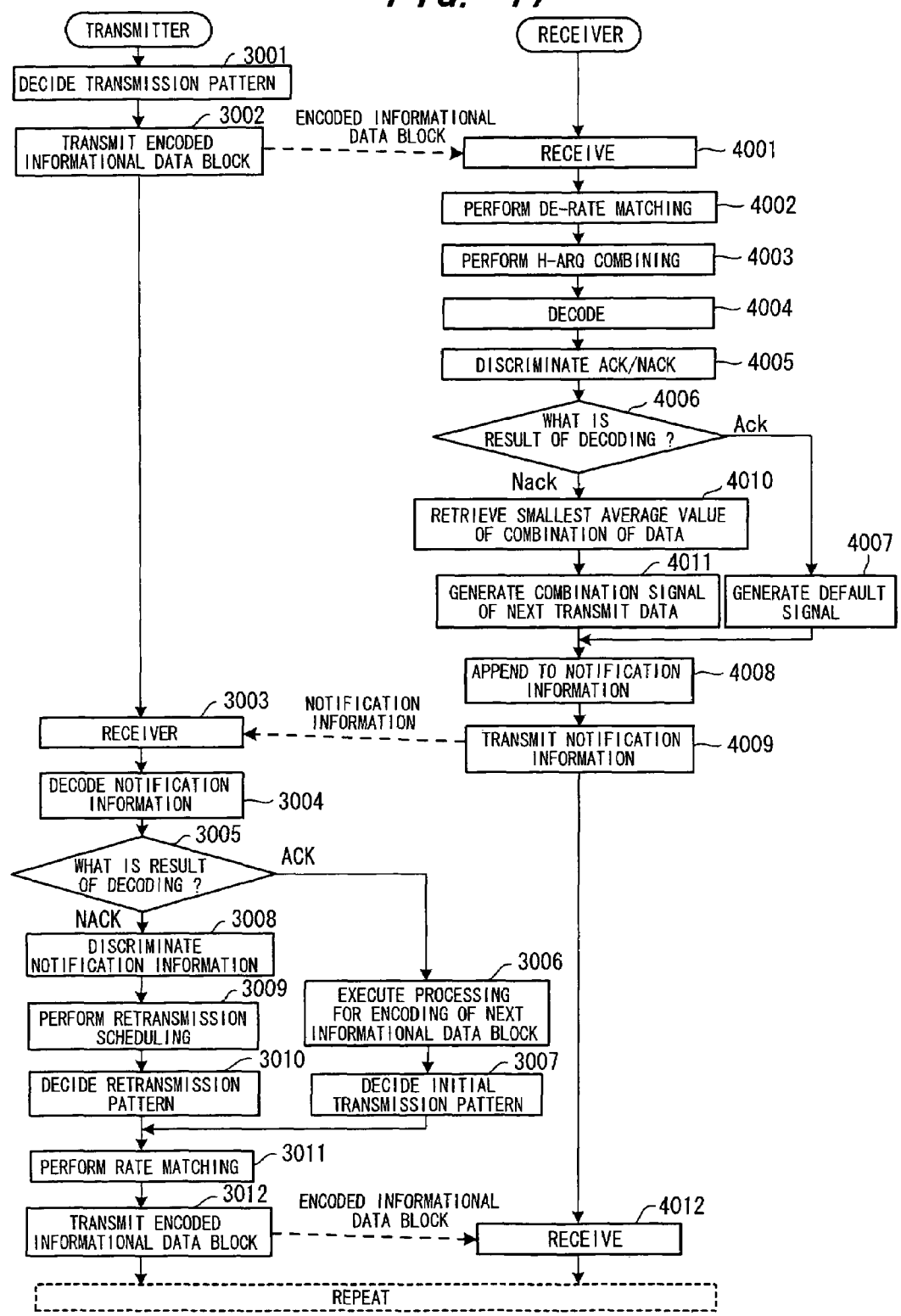
FIG. 17 is a flowchart of processing executed in a transmitter and receiver according to the eighth embodiment.

FIG. 17 is a flowchart of processing executed in a transmitter and receiver according to the eighth embodiment.

The transmitter 11 decides the transmission pattern, segments the encoded information blocks at (A) in FIG. 15 to packetize the same and transmits the packets (blocks) (steps 3001, 3002).

If the receiver 12 receives a packet (an encoded informational data block), then the receiver executes de-rate matching processing, H-ARQ combining processing, decoding processing and ACK/NACK discrimination processing (steps 4001 to 4005). If decoding succeeds, the receiver creates a default signal, appends the default signal to the notification information and transmits the information to the transmitter 1 (steps 4006 to 4009). If decoding fails, on the other hand, the receiver 12 retrieves the combination having the smallest average value, decides upon this combination as the combination of the next retransmission data (step 4010), creates retransmission pattern information that specifies this combination (step 4011), incorporates this retransmission pattern information in the notification information and transmits the information to the transmitter 11 (steps 4008, 4009).

The transmitter 11 receives the signal that has been transmitted from the receiver 12, decodes the notification information from the receive signal and discriminates ACK/NACK from the notification information (steps 3003 to 3005). If notification of ACK is given, then the transmitter 11 encodes the next informational data block (step 3006), refers to the CQI bits and decides the bit size and modulation scheme of the new data block (i.e., decides the initial transmission pattern at step 3007). If the notification is found to be NACK at step 3005, on the other hand, then the transmitter 11 discriminates the notification information, performs retransmission scheduling based upon the result of discrimination and selects the combination of bits to be transmitted based upon the retransmission pattern of the notification information (steps 3008 to 3010).

Step 3007 or 3009 is followed by execution of rate matching processing and transmission of the encoded informational data block (steps 3011, 3012). The receiver 12 receives the data block (step 4012), after which the transmitter and receiver repeat the processing described above.

(J) Ninth Embodiment

Figure 18:
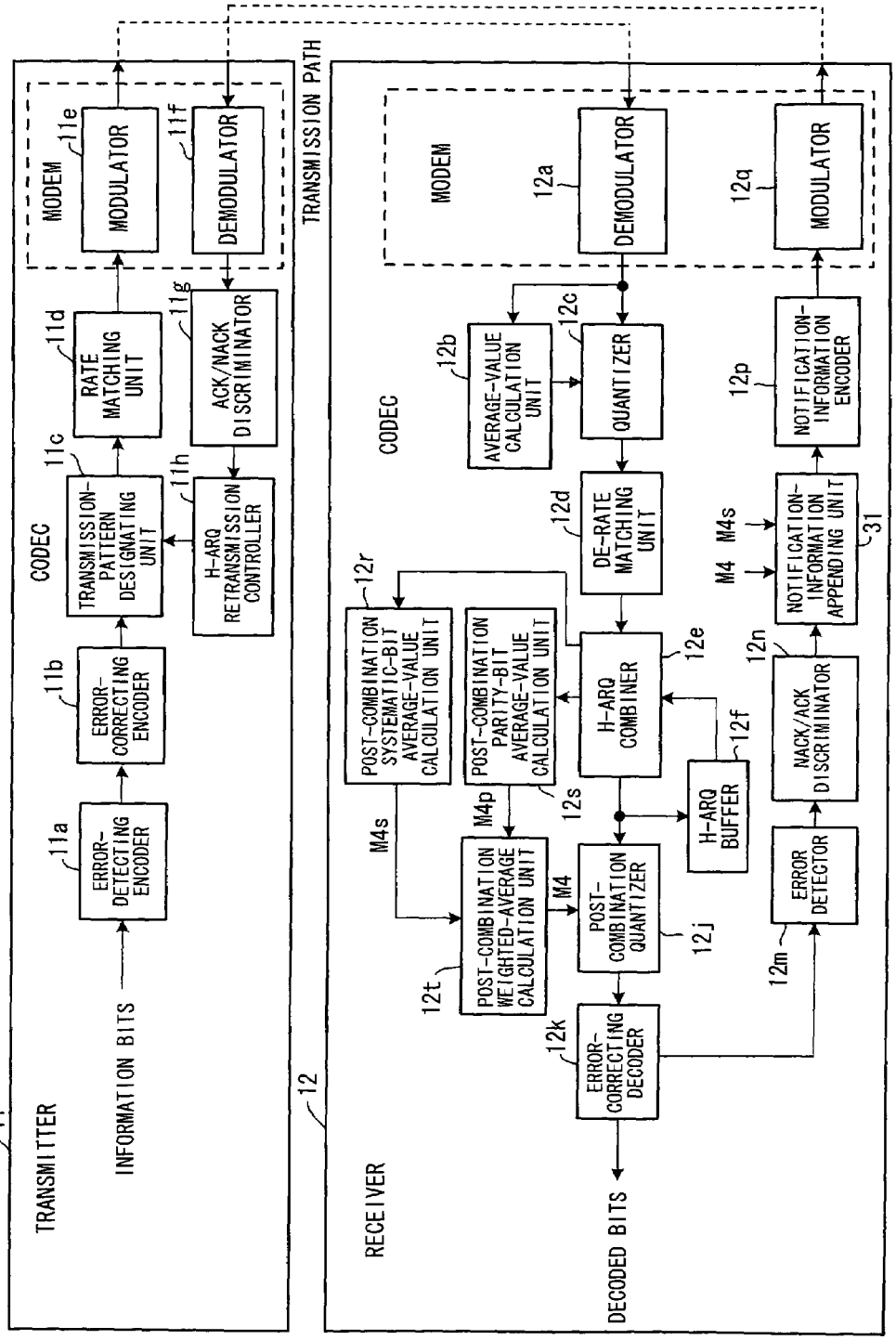
FIG. 18 is a block diagram of a transceiver according to a ninth embodiment of the present invention.

FIG. 18 is a block diagram of a transceiver according to a ninth embodiment of the present invention. This embodiment is obtained by additionally providing the transceiver of the second embodiment of FIG. 4 with a notification-information appending unit 31 for transmitting information (retransmission pattern information), which specifies the combination of the next retransmission data, to the transmitter together with the NACK information.

When reception fails and the receiver 12 makes a NACK determination in the ninth embodiment, the notification-information appending unit 31 compares M4, which is given by Equation (1), and the absolute-value average M4$s$ of the systematic bits. If M4 is greater than M4$s$, i.e., if the absolute-value average M4$p$ of the parity bits is greater than the absolute-value average M4$s$ of the systematic bits (M4$p$>M4$s$), then the notification-information appending unit 31 appends a signal, which specifies retransmission of data containing systematic bits, to the notification information as the combination of the next retransmission data.

Figure 19:
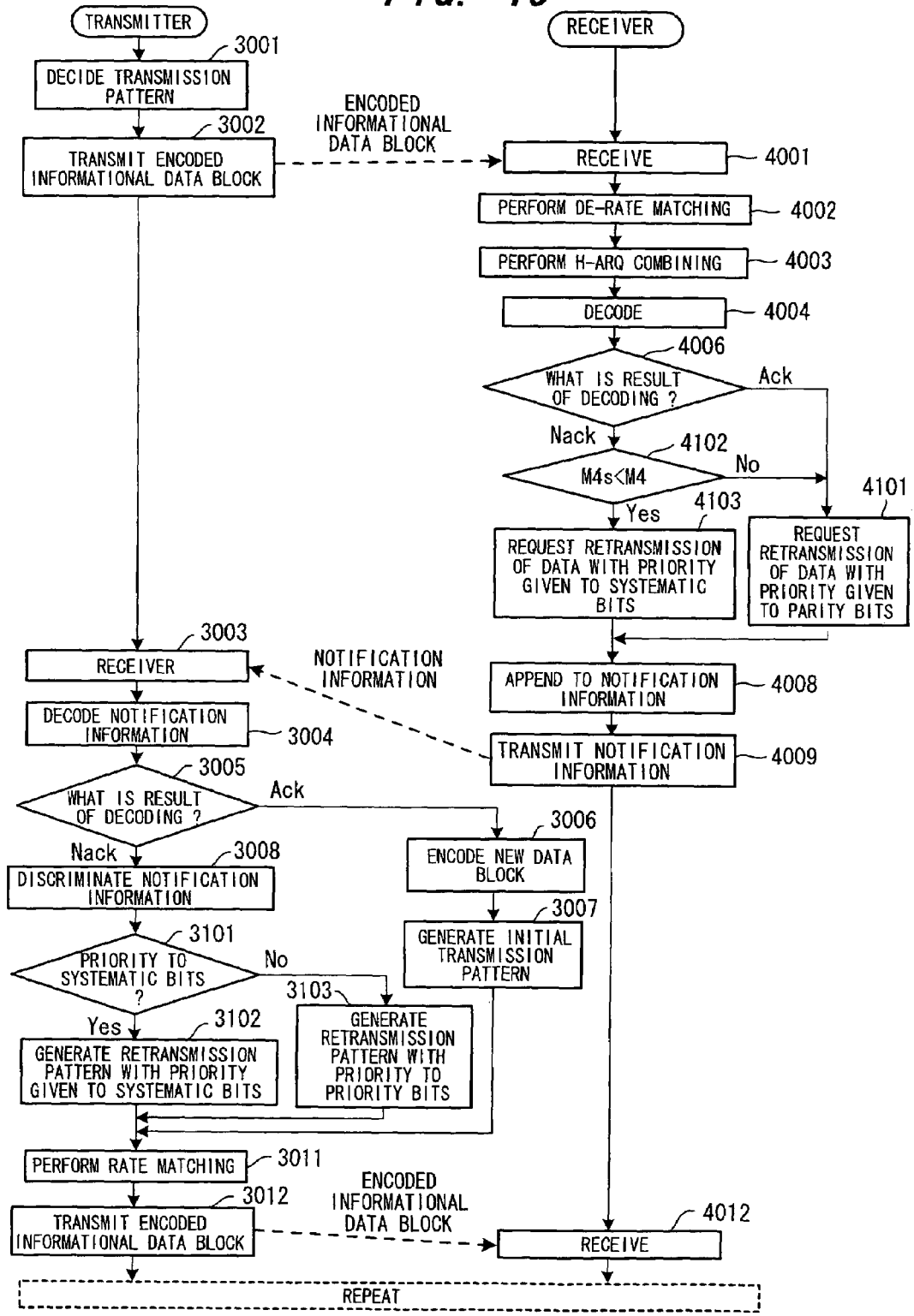
FIG. 19 is a flowchart of processing executed in a transmitter and receiver according to the ninth embodiment.

FIG. 19 is a flowchart of processing executed in a transmitter and receiver according to the ninth embodiment. Processing in FIG. 19 identical with that of the flowchart of FIG. 17 is designated by like step numbers.

If reception succeeds at step 4006, the receiver appends a signal, which specifies retransmission of data containing parity bits, to the notification information as the combination of the next retransmission data and transmits the information (steps 4101, steps 4008, 4009). If reception fails, M4 and M4$s$ are compared (step 4102). If M4<M4$s$, i.e., M4$p$<M4$s$, holds, then the receiver appends a signal, which specifies retransmission of data containing parity bits, to the notification information and transmits the information (step 4101, steps 4008, 4009).

If M4$p$>M4$s$ holds, on the other hand, then the receiver appends a signal, which specifies retransmission of data containing systematic bits, to the notification information as the combination of the next retransmission data and transmits the information (step 4103, steps 4008, 4009).

The transmitter 11 receives the notification information from the receiver 12 and, if notification of NACK is given, refers to the retransmission pattern information contained in the notification information and determines whether the systematic-bit data should be transmitted preferentially (step 3101). If priority transmission of the systematic-bit data has been indicated, the transmitter generates data, which contains the systematic bits, as the combination of the next retransmission data (step 3102). If priority transmission of the parity-bit data has been indicated, then the transmitter generates data, which contains the parity bits, as the combination of the next retransmission data (step 3103). The transmitter 11 transmits the retransmission data.

(K) Tenth Embodiment

Figure 20:
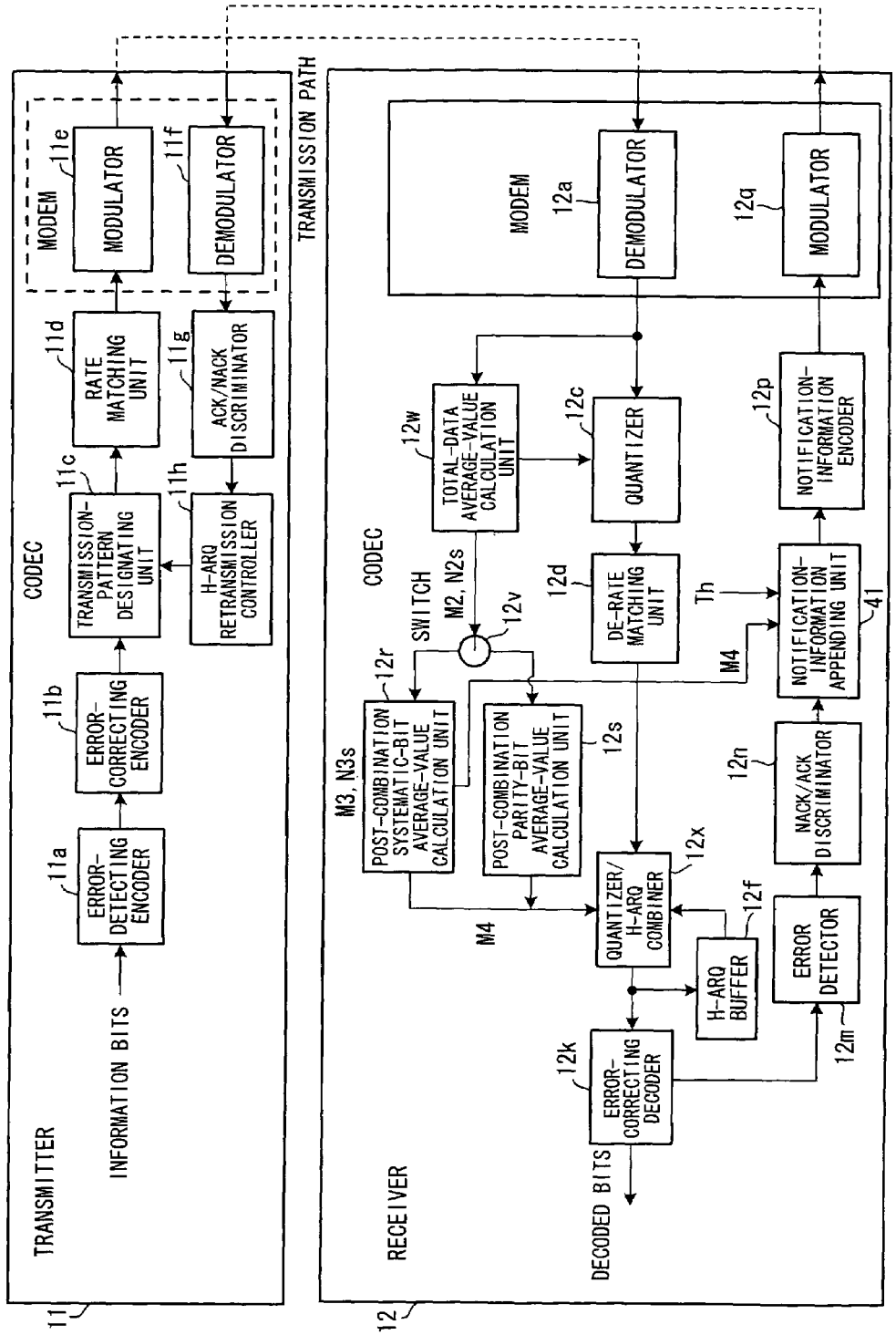
FIG. 20 is a block diagram of a transceiver according to a tenth embodiment of the present invention.

FIG. 20 is a block diagram of a transceiver according to a tenth embodiment of the present invention. This embodiment is obtained by additionally providing the transceiver of the fifth embodiment of FIG. 10 with a notification-information appending unit 41 for transmitting information (retransmission pattern information), which specifies the combination of the next retransmission data, to the transmitter together with the NACK information.

When reception fails and the receiver 12 makes a NACK determination in the tenth embodiment, the notification-information appending unit 41 compares the average value M4 [given by Equation (2)] of systematic bits after the combining thereof and a prescribed constant value Th. If M4 is less than Th, then the notification-information appending unit 41 appends a signal, which specifies retransmission of data containing systematic bits, to the notification information as the combination of the next retransmission data.

Figure 21:
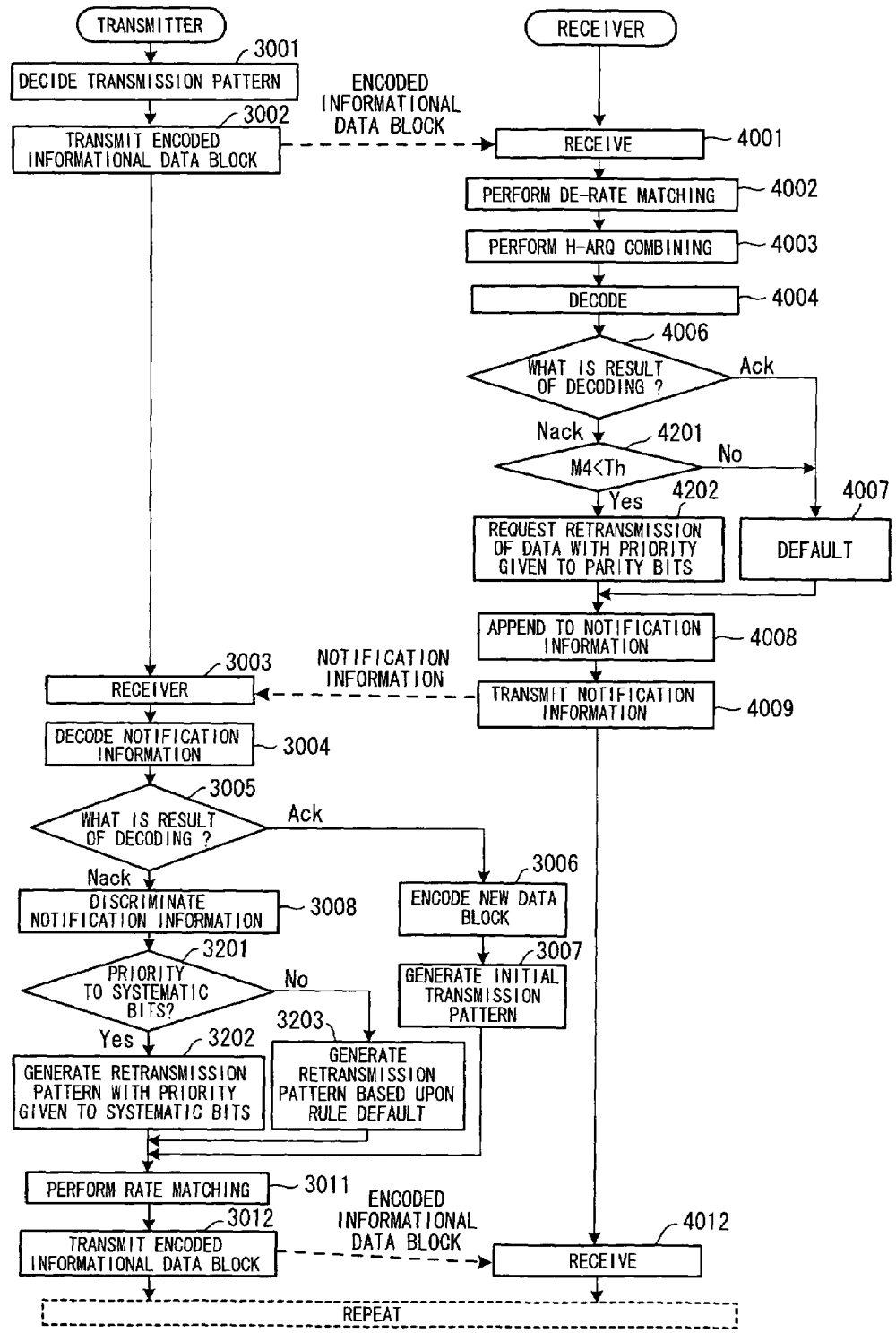
FIG. 21 is a flowchart of processing executed in a transmitter and receiver according to the tenth embodiment.

FIG. 21 is a flowchart of processing executed in a transmitter and receiver according to the tenth embodiment. Processing in FIG. 21 identical with that of the flowchart of FIG. 17 is designated by like step numbers.

If reception succeeds at step 4006, the receiver creates a default signal, appends the default signal to the notification information and transmits the information to the transmitter (steps 4007 to 4009). If decoding fails, on the other hand, then the notification-information appending unit 41 compares the average value M4 of systematic bits after combining and the prescribed constant value Th (step 4201). If M4>Th holds, then the receiver creates the default signal, appends the default signal to the notification information and transmits the information (steps 4007 to 4009). If M4<Th holds, however, then the receiver appends a signal, which specifies retransmission of data containing systematic bits, to the notification information and transmits the information (step 4202, steps 4008, 4009).

The transmitter 11 receives the notification information from the receiver 12 and, if notification of NACK is given, refers to the notification information and determines whether the systematic-bit data should be transmitted preferentially (step 3201). If priority transmission of the systematic-bit data has been specified, the transmitter generates data, which contains the systematic bits, as the combination of the next retransmission data (step 3202). If the notification information contains the default signal, then the transmitter decides the combination of next retransmission data in accordance with a rule stipulated in advance and generates this retransmission data (step 3203). The transmitter 11 transmits the retransmission data.

Figure 22:
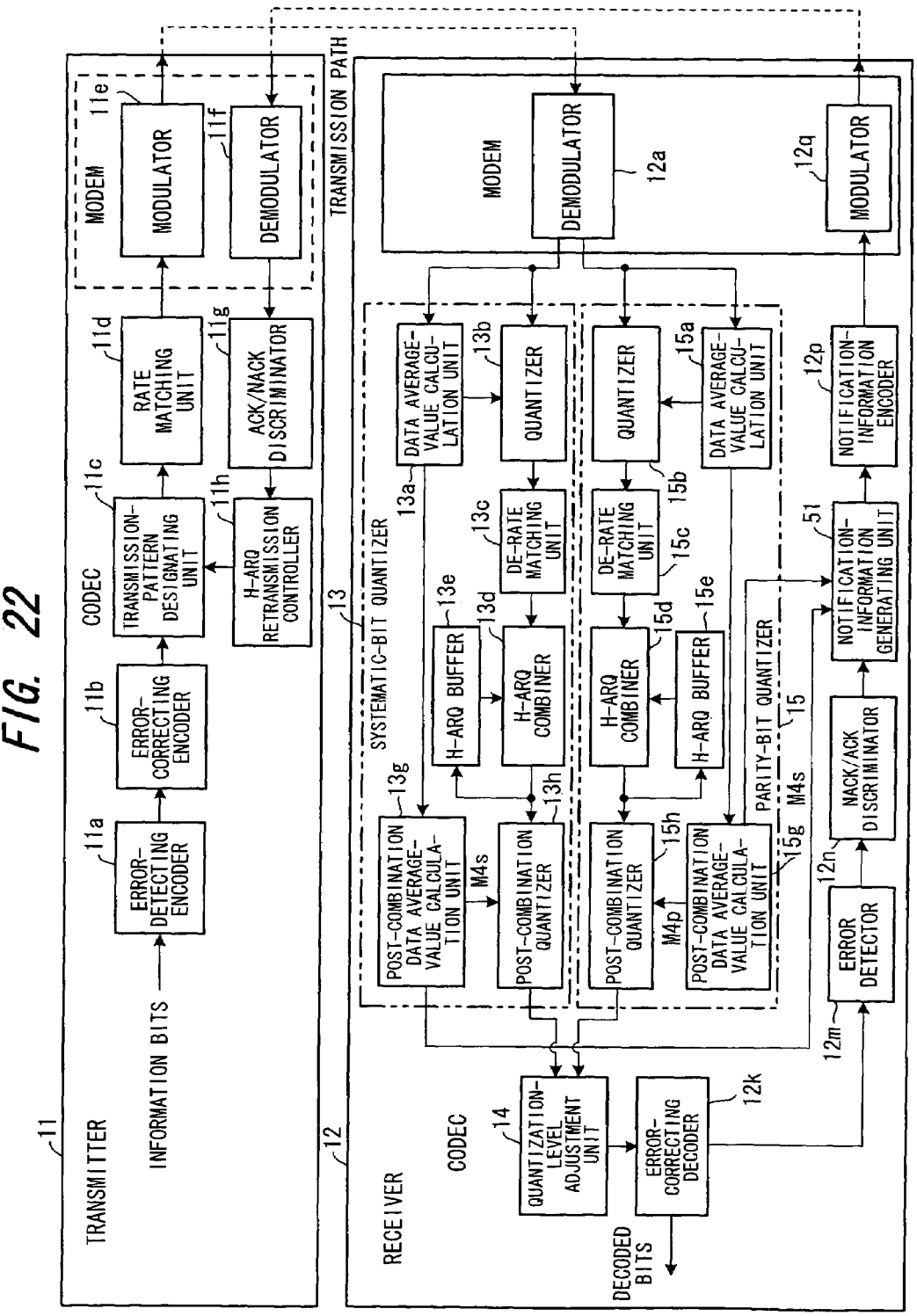
FIG. 22 is a block diagram of a transceiver according to an 11th embodiment of the present invention.

FIG. 22 is a block diagram of a transceiver according to an $11^{th}$ embodiment of the present invention. This embodiment is obtained by additionally providing the transceiver of the seventh embodiment of FIG. 12 with a notification-information generating unit 51 for transmitting information (retransmission pattern information), which specifies the combination of the next retransmission data, to the transmitter together with the NACK information.

When reception fails and the receiver 12 makes a NACK determination in the $11^{th}$ embodiment, the notification-information generating unit 51 weights the average value M4$s$ of systematic bits calculated according to Equation (4) and the average value M4$p$ of parity bits calculated according to Equation (5) by weighting coefficients $\alpha s$, $\alpha p$, respectively, and compares the weighted averages. If $\alpha s \cdot M4s$ is less than $\alpha p \cdot M4p$, the notification-information generating unit 51 appends a signal, which specifies retransmission of data containing systematic bits, to the notification information as the combination of the next retransmission data. If M4$p$ is less than M4$s$, then the notification-information generating unit 51 appends a signal, which specifies retransmission of data containing parity bits, to the notification information as the combination of the next retransmission data.

Figure 23:
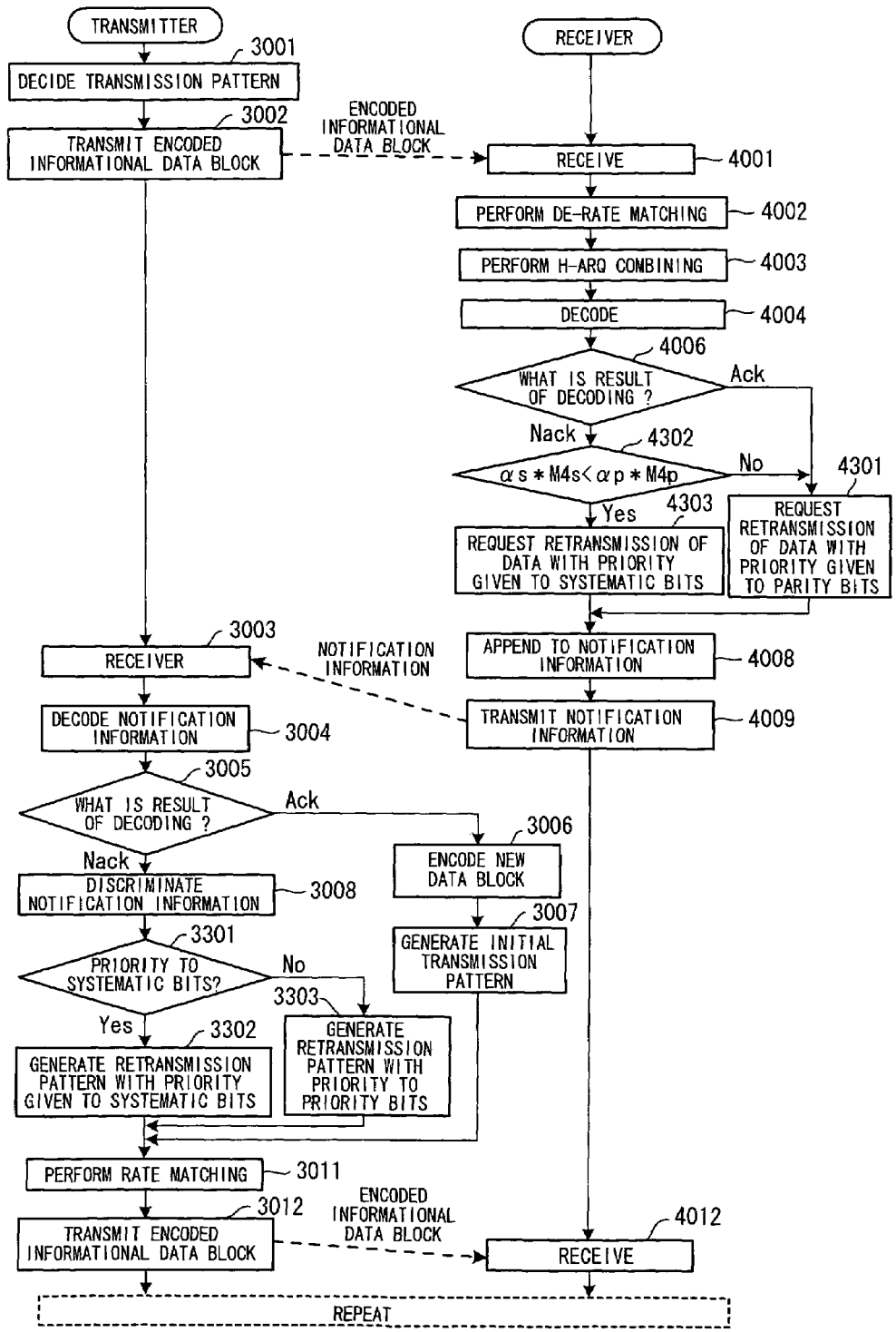
FIG. 23 is a flowchart of processing executed in a transmitter and receiver according to the 11th embodiment.

FIG. 23 is a flowchart of processing executed in a transmitter and receiver according to the $11^{th}$ embodiment. Processing in FIG. 23 identical with that of the flowchart of FIG. 17 is designated by like step numbers.

If reception succeeds (ACK) at step 4006, the receiver appends a signal, which specifies retransmission of data containing parity bits, to the notification information as the combination of the next retransmission data and then transmits the information (step 4301, steps 4008, 4009). If reception fails, the receiver compares $\alpha s \cdot M4s$ and $\alpha p \cdot M4p$ (step 4302) and, if $\alpha s \cdot Ms > \alpha p \cdot M4p$ holds, appends a signal, which specifies retransmission of data containing parity bits, to the notification information and then transmits the information (step 4301, steps 4008, 4009).

If $\alpha s \cdot M4s < \alpha p \cdot M4p$ holds, on the other hand, then the receiver appends a signal, which specifies retransmission of data containing systematic bits, to the notification information as the combination of the next retransmission data and then transmits the information (step 4303, steps 4008, 4009).

The transmitter 11 receives the notification information from the receiver 12 and, if notification of NACK is given, determines whether the systematic-bit data should be transmitted preferentially (step 3301). If priority transmission of the systematic-bit data has been specified, the transmitter generates data, which contains the systematic bits, as the combination of the next retransmission data (step 3302). If priority transmission of the parity-bit data has been specified, the transmitter generates data, which contains the parity bits, as the combination of the next retransmission data (step 3303). The transmitter 11 transmits the retransmission data.

Figure 24:
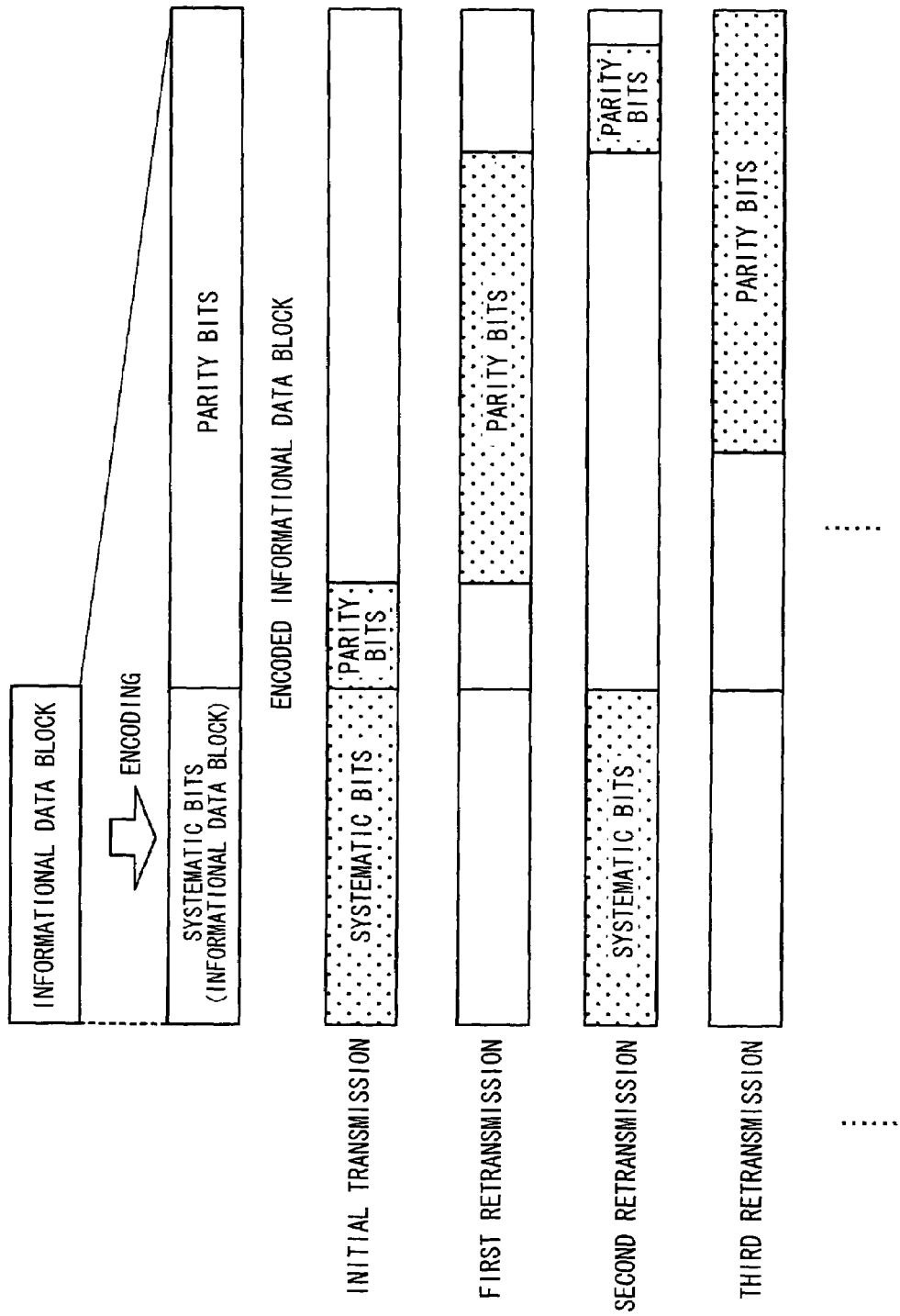
FIG. 24 illustrates an example of retransmission patterns.
Figure 25:
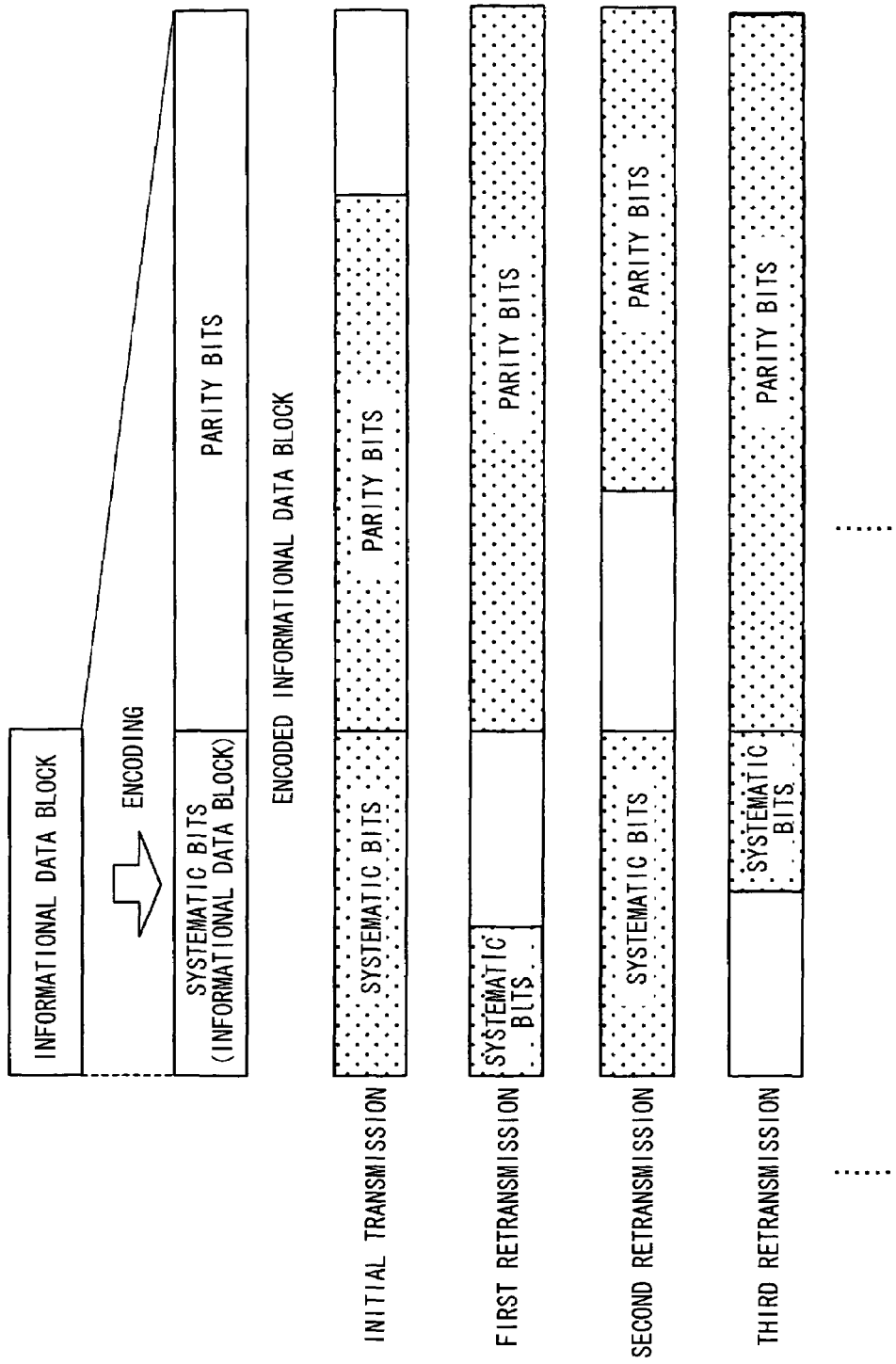
FIG. 25 illustrates another example of retransmission patterns.
Figure 26:
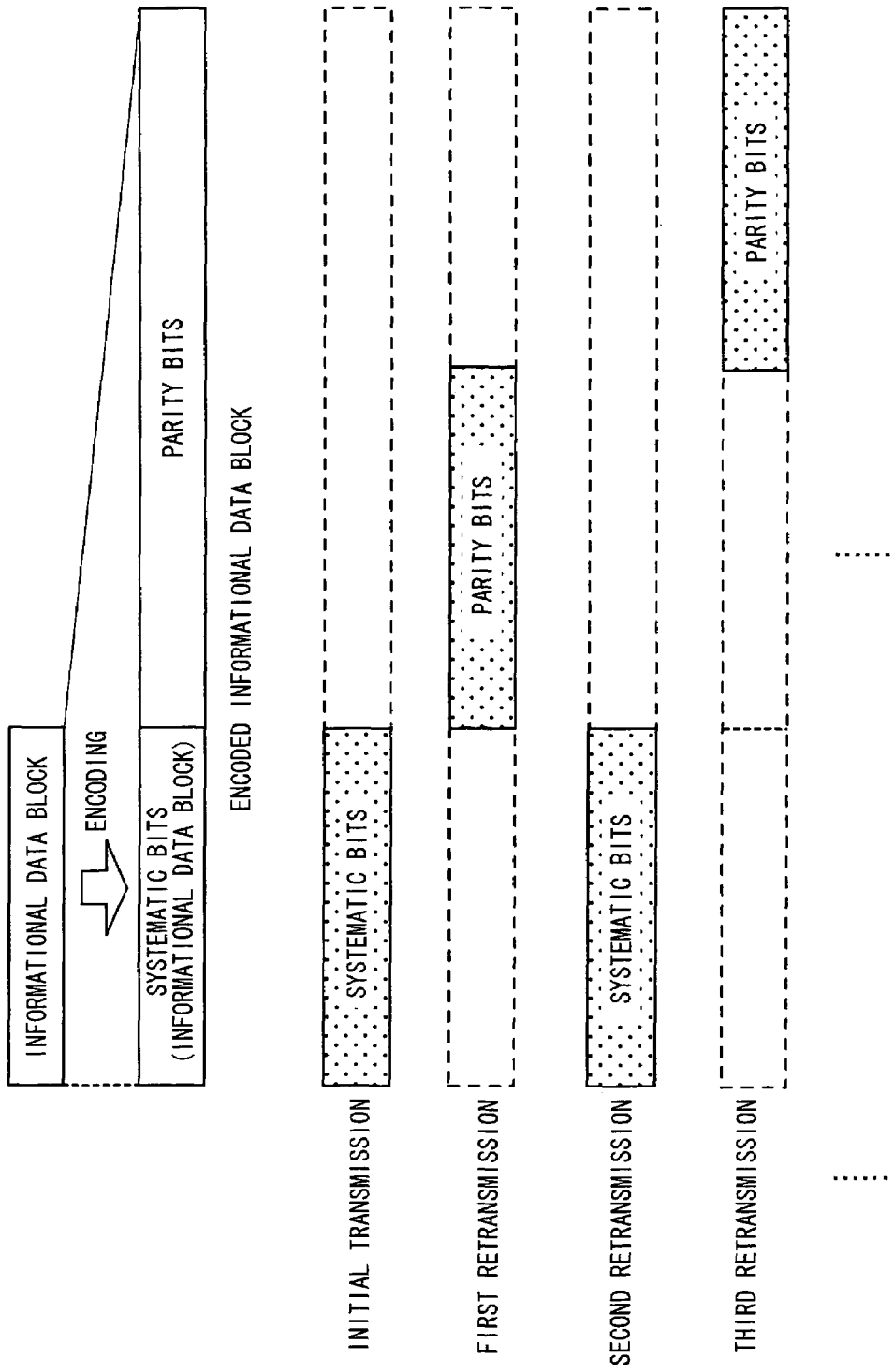
FIG. 26 illustrates an example of a process for retransmitting a systematic code having an encoding rate of 1/3 according to the prior art.
Figure 27:
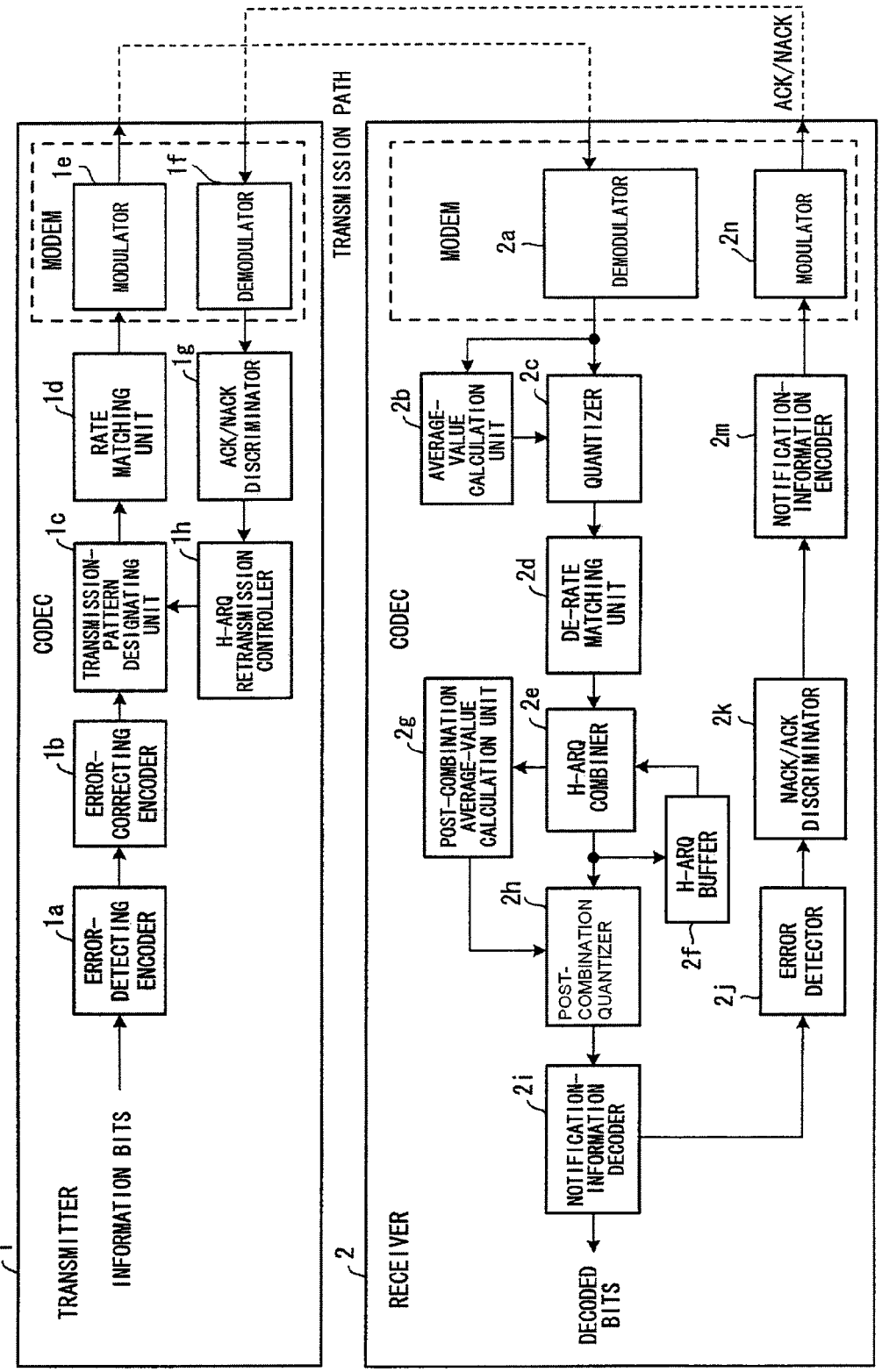
FIG. 27 is a block diagram of a transmitter and a receiver 2 in a communication system according to the prior art.

The foregoing is for a case where retransmission is performed in accordance with the patterns exemplified in FIGS. 3 and 5 as the retransmission patterns. However, retransmission is not limited to the patterns of FIG. 3 and can also be performed in accordance with the patterns shown in FIG. 24. Similarly, retransmission is not limited to the patterns of FIG. 5 and can also be performed in accordance with the patterns shown in FIG. 25.

Thus, by applying the present invention to a communication system, degradation of data due to combining can be avoided. This makes it possible to reduce the number of retransmissions and raise the throughput of the system. As a result, needless decoding processing can be avoided, power consumption can be reduced and, at the same time, it is possible to increase the capacity of a communication line based upon the repeating of a retransmission response.

As many apparently widely different embodiments of the present invention can be made without departing from the spirit and scope thereof, it is to be understood that the invention is not limited to the specific embodiments thereof except as defined in the appended claims.

What is claimed is:

1. A receiving apparatus in a communication system in which when an encoded transmit data cannot be decoded correctly on a receiving side, the transmit data is retransmitted from a transmitting side, comprising:
   receiving portion for receiving retransmission data;
   combiner for combining stored data, which has been generated based upon data already received, and newly received data and outputting the combined data;
   average-value calculation portion for calculating an average value of the amplitude of the combined data;
   receiving portion for receiving an encoding rate of the transmit data that is sent from the transmitting side on a control channel;
   deciding portion for deciding a range of quantization levels of the combined data by multiplying the average value of the amplitude of the combined data by a predetermined magnification m that conforms to the encoding rate;
   quantizing means for quantizing the combined data based upon the range of quantization levels and number of quantization bits;
   decoder for applying decoding processing to the quantized data;
   notifying portion for notifying the transmitting side of whether decoding could be performed correctly; and
   storing portion for storing the combined data as the stored data when decoding cannot be performed correctly.

2. A receiving apparatus in a communication system in which when systematically encoded transmit data cannot be decoded correctly on a receiving side, the transmit data is retransmitted from a transmitting side, comprising:

receiving portion for receiving a-retransmission data;

combiner for combining stored data, which has been generated based upon data already received, and newly received data and outputting the combined data;

systematic-bit average-value calculation portion for calculating an absolute-value average only of systematic bits that constitute the combined data;

deciding portion for deciding a range of quantization levels of the combined data using the absolute-value average of systematic bits of the combined data;

quantizing portion for quantizing the combined data based upon the range of quantization levels and number of quantization bits;

decoder for applying decoding processing to the quantized data;

notifying portion for notifying the transmitting side of whether decoding could be performed correctly; and storing portion for storing the combined data as the stored data when decoding cannot be performed correctly.

3. The apparatus according to claim 2, wherein if systematic bits do not exist in the combined data, then said deciding portion decides the range of quantization levels using an average level of parity bits that constitute the combined data, and said quantizing portion quantizes the combined data based this range of quantization levels.

4. A receiving apparatus in a communication system in which when a-systematically encoded transmit data cannot be decoded correctly on a receiving side, the transmit data is retransmitted from a transmitting side, comprising:

receiving portion for receiving retransmission data;

combiner for combining stored data, which has been generated based upon data already received, and newly received data and outputting the combined data;

systematic-bit average-value calculation portion for calculating an absolute-value average only of systematic bits that constitute the combined data;

parity-bit average-value calculation portion for calculating an absolute-value average only of parity bits that constitute the combined data;

deciding portion for deciding a range of quantization levels of the combined data using a weighted average level of the average level of systematic bits of the combined data and the average level of parity bits of the combined data;

quantizing portion for quantizing the combined data based upon the range of quantization levels and number of quantization bits;

decoder for applying decoding processing to the quantized data; notifying portion for notifying the transmitting side of whether decoding could be performed correctly; and storing portion for storing the combined data as the stored data when decoding cannot be performed correctly.

5. The apparatus according to claim 4, wherein the range of quantization levels is decided upon making weight of the average level of systematic bits greater than weight of the average level of parity bits.

6. A receiving apparatus in a communication system in which when systematically encoded transmit data cannot be decoded correctly on a receiving side, the transmit data is retransmitted from a transmitting side, comprising the following units with regard to receive data composed of systematic bits:

combiner for combining stored data, which has been generated based upon data already received, and newly received data and outputting the combined data;

deciding portion for deciding a range of quantization levels of the combined data using an average level of systematic bits of the stored data and systematic bits of the newly received data;

quantizing portion for quantizing the combined data based upon the range of quantization levels and number of quantization bits; and storing portion for storing the combined data as the stored data if decoding could not be performed correctly;

and comprising the following units with regard to receive data composed of parity bits:

combiner for combining stored data, which has been generated based upon data already received, and newly received data and outputting the combined data;

deciding portion for deciding a range of quantization levels of the combined data using an average level of parity bits of the stored data and parity bits of the newly received data;

quantizing portion for quantizing the combined data based upon the range of quantization levels and number of quantization bits; and storing portion for storing the combined data as the stored data if decoding could not be performed correctly;

said receiving apparatus further comprising:

decoding means for executing decoding processing using each item of quantized data; and means for notifying the transmitting side of whether decoding could be performed correctly.

7. A receiving apparatus in a communication system in which when encoded transmit data cannot be decoded correctly on a receiving side, combinations of data constituting the transmit data are retransmitted from a transmitting side to the receiving side in order, comprising:

receiving portion for receiving a retransmission signal;

combiner for combining stored data, which has been generated based upon data already received, and newly received data and outputting the combined data;

first deciding portion for deciding a range of quantization levels of the combined data based upon a characteristic of the stored data and newly received data;

quantizing portion for quantizing the combined data based upon the range of quantization levels and number of quantization bits;

decoder for applying decoding processing to the quantized data;

second deciding portion for deciding a combination of next retransmission data if decoding could not be performed correctly;

notifying portion for notifying the transmitting side of information as to whether decoding could be performed correctly and of combination information of the retransmission data; and storing portion for storing the combined data as the stored data if decoding could not be performed correctly.

8. The apparatus according to claim 7, wherein said second deciding portion calculates an average level for every combination of retransmission data and decides upon a combination of retransmission data, for which the average level is smallest, as a combination of next retransmission data.

9. The apparatus according to claim 7, wherein if a systematic code is received from the transmitting side, said second deciding portion measures reliability of systematic bits and, if the reliability is less than a set value, decides the combination of the retransmission data so as to transmit the systematic bits preferentially as the next retransmission data.

10. The apparatus according to claim 7, wherein if a systematic code is received from the transmitting side, said second deciding portion measures reliability of the data of the systematic bits and of the parity bits, applies a stipulated weighting coefficient to these reliabilities and decides the combination of retransmission data so as to transmit the data having the lower reliability preferentially as the next retransmission data.

11. A receiving method in a communication system in which when encoded transmit data cannot be decoded correctly on a receiving side, the transmit data is retransmitted from a transmitting side, comprising the steps of:
  combining stored data, which has been generated based upon data already received, and newly received data and outputting the combined data;
  calculating an average value of the amplitude of the combined data;
  receiving an encoding rate of the transmit data that is sent from the transmitting side on a control channel;
  deciding a range of quantization levels of the combined data by multiplying the average value of the amplitude of the combined data by a predetermined magnification m that conforms to the encoding rate;
  quantizing the combined data based upon the range of quantization levels and number of quantization bits;
  applying decoding processing to the quantized data and notifying the transmitting side of whether decoding could be performed correctly; and
  storing the combined data as the stored data if decoding could not be performed correctly and clearing the stored data if decoding could be performed correctly.

12. A receiving method in a communication system in which when systematically encoded transmit data cannot be decoded correctly on a receiving side, the transmit data is retransmitted from a transmitting side, comprising the following steps with regard to receive data composed of systematic bits:
  combining stored data, which has been generated based upon data already received, and newly received data and outputting the combined data;
  deciding a range of quantization levels of the combined data using an average level of systematic bits of the stored data and systematic bits of the newly received data; and
  quantizing the combined data based upon the range of quantization levels and number of quantization bits;
  and comprising the following steps with regard to receive data composed of parity bits:
  combining stored data, which has been generated based upon data already received, and newly received data and outputting the combined data;
  deciding a range of quantization levels of the combined data using an average level of parity bits of the stored data and parity bits of the newly received data;
  quantizing the combined data based upon the range of quantization levels and number of quantization bits;
  said receiving method further comprising the steps of:
  executing decoding processing using each item of the data obtained by each quantization and notifying the transmitting side of whether decoding could be performed correctly; and
  storing each item of combined data as the stored data if decoding could not be performed correctly, and clearing each item of the stored data if decoding could be performed correctly.

13. A receiving method in a communication system in which when encoded transmit data cannot be decoded correctly on a receiving side, combinations of data constituting the transmit data are retransmitted from a transmitting side to the receiving side in order, comprising the steps of:
  combining stored data, which has been generated based upon data already received, and newly received data and outputting the combined data;
  deciding a range of quantization levels of the combined data based upon a characteristic of the stored data and newly received data;
  quantizing the combined data based upon the range of quantization levels and number of quantization bits;
  applying decoding processing to the quantized data and deciding a combination of next retransmission data if decoding could not be performed correctly;
  notifying the transmitting side of information as to whether decoding could be performed correctly and of combination information of the retransmission data; and
  storing the combined data as the stored data if decoding could not be performed correctly and clearing the stored data if decoding could be performed correctly.

14. The method according to claim 13, wherein if a systematic code is received from the transmitting side, said step of deciding a combination of retransmission data includes measuring reliability of systematic bits and, if the reliability is less than a set value, deciding the combination of the retransmission data so as to transmit the systematic bits preferentially as the next retransmission data.

15. The method according to claim 13, wherein if a systematic code is received from the transmitting side, said step of deciding a combination of retransmission data includes measuring reliability of the data of the systematic bits and of the parity bits, applying a stipulated weighting coefficient to these reliabilities and deciding the combination of retransmission data so as to transmit the data having the lower reliability preferentially as the next retransmission data.

16. A receiving apparatus in a communication system in which when systematically encoded transmit data cannot be decoded correctly on a receiving side, the transmit data is retransmitted from a transmitting side, comprising:
  receiving portion for receiving retransmission data and outputting the received data;
  combiner for combining stored data, which has been generated based upon data already received, and newly received data and outputting the combined data;
  first average-value calculation portion for calculating an average level of systematic bits of the stored data and systematic bits of the newly received data with regard to the receive data composed of systematic bits;
  second average-value calculation portion for calculating an average level of parity bits of the stored data and parity bits of the newly received data with regard to the receive data composed of parity bits;
  quantizing portion for deciding a range of quantization levels of the combined data using the average level of systematic bits with regard to the receive data composed only of systematic bits, deciding a range of quantization levels of the combined data using the average level of parity bits with regard to the receive data composed only of parity bits and quantizing the combined data based upon the range of quantization levels and number of quantization bits;
  decoder for applying decoding processing to the quantized data;
  notifying portion of notifying the transmitting side of whether decoding could be performed correctly; and storing portion for storing the combined data as the stored data when decoding cannot be performed correctly.

17. A receiving apparatus in a communication system in which when systematically encoded transmit data cannot be decoded correctly on a receiving side, the transmit data is retransmitted from a transmitting side, comprising:

receiving portion for receiving retransmission data and outputting the received data;

combiner for combining stored data, which has been generated based upon data already received, and newly received data and outputting the combined data;

first average calculation portion for calculating an average value of newly received data;

second average calculation portion for calculating an average value of the stored data and the newly received data;

storing portion for storing the average value calculated by the second average calculation portion;

deciding portion for (1) deciding, if only retransmission data possesses data corresponding to systematic bits, a range of quantization levels based upon the average value calculated by the first average calculation portion, (2) deciding, if only stored data possesses data corresponding to systematic bits, a range of quantization levels based upon the average value which has been stored in said storing portion, and (3) deciding, otherwise, a range of quantization levels based upon the average value calculated by the second average calculation portion;

quantizing portion for quantizing the combined data based upon the range of quantization levels and number of quantization bits;

decoder for applying decoding processing to the quantized data;

notifying portion for notifying the transmitting side of whether decoding could be performed correctly; and storing portion for storing the combined data as the stored data when decoding cannot be performed correctly.

18. A receiving method in a communication system in which when systematically encoded transmit data cannot be decoded correctly on a receiving side, the transmit data is retransmitted from a transmitting side, comprising:

receiving retransmission data and outputting the received data;

combining stored data, which has been generated based upon data already received, and newly received data and outputting the combined data;

calculating an absolute-value average only of systematic bits which constitute the combined data;

deciding portion for deciding a range of quantization levels of the combined data using the absolute-value average of systematic bits of the combined data and quantizing the combined data based upon the range of quantization levels and number of quantization bits;

applying decoding processing to the processing to the quantized data;

notifying the transmitting side of whether decoding could be performed correctly; and storing the combined data as the stored data when decoding cannot be performed correctly.

19. A receiving method in a communication system in which when systematically encoded transmit data cannot be decoded correctly on a receiving side, the transmit data is retransmitted from a transmitting side, comprising:

receiving portion for receiving retransmission data;

combining stored data, which has been generated based upon data already received, and newly received data and outputting the combined data;

calculating an absolute-value average only of systematic bits which constitute the combined data and calculating an absolute-value average only of parity bits which constitute the combined data;

deciding a range of quantization levels of the combined data using a weighted average level of the average level of systematic bits of the combined data and the average level of parity bits of the combined data;

quantizing the combined data based upon the range of quantization levels and number of quantization bits;

applying decoding processing to the quantized data;

notifying the transmitting side of whether decoding could be performed correctly; and storing the combined data as the stored data when decoding cannot be performed correctly.

* * * * *